US010565372B1

(12) United States Patent
Stickle et al.

(10) Patent No.: US 10,565,372 B1
(45) Date of Patent: *Feb. 18, 2020

(54) SUBSCRIPTION-BASED MULTI-TENANT THREAT INTELLIGENCE SERVICE

(71) Applicant: Amazon Technologies, Inc., Seattle, WA (US)

(72) Inventors: Thomas Charles Stickle, Saint James, NY (US); Shane Anil Pereira, Bellevue, WA (US); Adam Schodde, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 132 days.

This patent is subject to a terminal disclaimer.

(21) Appl. No.: 15/668,308

(22) Filed: Aug. 3, 2017

(51) Int. Cl.
*G06F 21/55* (2013.01)
*G06F 12/14* (2006.01)
*H04L 29/06* (2006.01)

(52) U.S. Cl.
CPC .............. *G06F 21/55* (2013.01); *G06F 12/14* (2013.01); *H04L 63/1433* (2013.01); *H04L 63/20* (2013.01)

(58) Field of Classification Search
None
See application file for complete search history.

(56) References Cited

U.S. PATENT DOCUMENTS

| 9,124,636 | B1* | 9/2015 | Rathor ................... H04L 63/20 |
| 2016/0359915 | A1 | 12/2016 | Gupta et al. |
| 2017/0063920 | A1* | 3/2017 | Thomas ................... H04L 9/32 |
| 2017/0142144 | A1* | 5/2017 | Weinberger ......... H04L 63/0263 |
| 2017/0163666 | A1 | 6/2017 | Venkatramani et al. |
| 2017/0171235 | A1* | 6/2017 | Mulchandani ...... H04L 63/1425 |
| 2017/0272469 | A1* | 9/2017 | Kraemer ............. H04L 63/1416 |
| 2018/0113952 | A1* | 4/2018 | Brown ................ G06F 21/6227 |
| 2018/0191771 | A1* | 7/2018 | Newman ............. H04L 63/1433 |

* cited by examiner

*Primary Examiner* — Kambiz Zand
*Assistant Examiner* — Arezoo Sherkat
(74) *Attorney, Agent, or Firm* — Quarles & Brady LLP

(57) ABSTRACT

Systems for providing a subscription-based multi-tenant threat intelligence service are provided. The systems receive first threat information associated with a first source of a first threat intelligence feed. Receive an indication that a first user associated with a first computing resource within a compute environment has subscribed to the first threat intelligence feed. Determine, based on the first threat information and the first user's subscription to the first threat intelligence feed, that a portion of activity associated with the first computing resource includes activity by an endpoint identified in the first threat information. In response to determining that the portion of the activity includes activity by an endpoint identified in the first threat information, perform an action.

15 Claims, 9 Drawing Sheets

300

SUBSCRIPTION-BASED MULTI-TENANT THREAT INTELLIGENCE SERVICE

BACKGROUND

Generally described, computing devices utilize a communication network, or a series of communication networks, to exchange data. Companies and organizations operate computer networks that interconnect a number of computing devices to support operations or provide services to third parties. The computing systems may be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

To facilitate increased utilization of data center resources, virtualization technologies may allow a single physical computing device to host one or more instances of virtual machines that appear and operate as independent computing devices to users of a data center. The single physical computing device may create, maintain, delete, or otherwise manage virtual machines in a dynamic manner. In some scenarios, various computing devices may be associated with different combinations of operating systems or operating system configurations, virtualized hardware resources and software applications to enable a computing device to provide different desired functionalities, or to provide similar functionalities more efficiently. Further, virtual machines may themselves be partitioned into multiple isolated virtual systems, sometimes referred to as "containers." The virtual machine controls allocation of resources such as processing power and memory, and each container has its own process and network space in which the container may, for example, execute software programs.

In such a system, a service provider may provide virtual machine resources to many different users, and may operate disparate physical computing devices that communicate with each other and with external resources over any number of networks and sub-networks of varying types. Such systems may benefit from monitoring of network traffic for potentially malicious communications. To analyze communications and resources, network monitoring services can make use of aggregated, up-to-date information about hackers and other bad actors, malware and other malicious code and communications, viruses, compromised systems, and other threats to data security and system control and reliability. Such information can be provided in, for example, a threat intelligence feed.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1A:
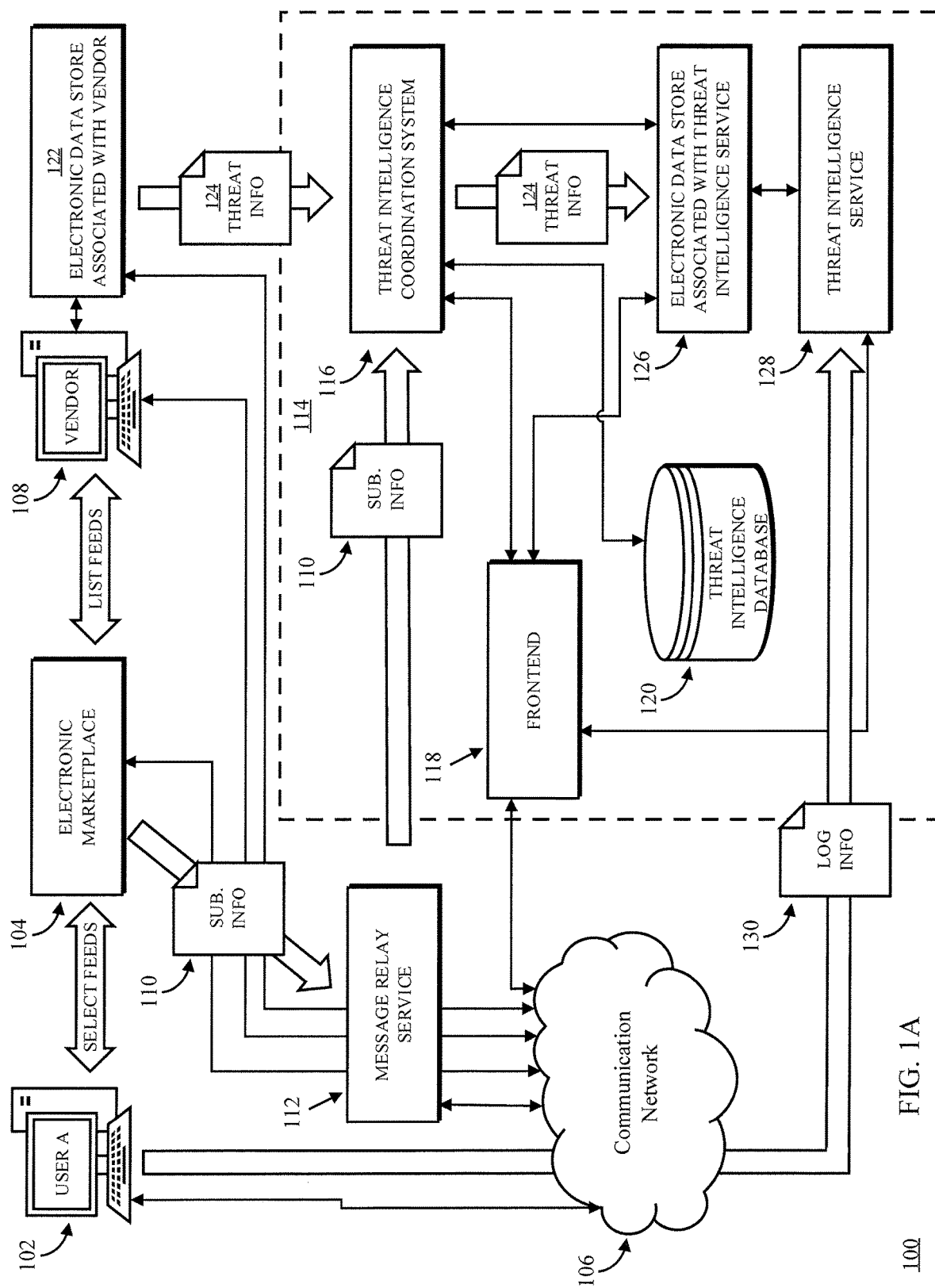
FIGS. 1A and 1B are diagrams of example systems for providing a subscription-based multi-tenant threat intelligence service in accordance with some embodiments of the disclosed subject matter.

Developers and/or other users that use computing environments, such as a virtual network, to perform computing operations (e.g., execute tasks for providing applications, services, database access, etc.) may wish to monitor network activity on the computing environment for activity from and/or to potentially malicious sources and/or destinations. For example, feeds of threat intelligence are available from various sources that purportedly identifies resource characteristics, such as an Internet Protocol ("IP") address, which may represent potentially malicious actors. Accordingly, if the user has access to this information, the user would need to be able to monitor incoming and outgoing traffic to the user's computing resources on the computing environment. However, this can be complicated because the user may have to install software on the computing environment to gather data about network activity and analyze that data. This can be a relatively complex endeavor. For example, this may require that the user utilize additional computing resources on the computing environment to monitor activity, which may cost more and/or require that the user forgo using the same resources for other, more productive, uses. As another example, the user may need to frequently check for and/or acquire updated threat information. As still another example, the user may need to extract useful information from the threat intelligence feeds, which may be in different formats requiring different operations to extract the information that is useful to the user. As yet another example, the amount of network activity associated with a computing environment can be voluminous. In a more particular example, a single physical data center associated with a computing environment may produce billions or trillions of records of network activity every hour. If a significant number of users of the computing environment implemented network monitoring techniques using the computing resources of the computing environment it would create a significant amount of demand for computing resources, which may require more physical computing devices and/or higher prices to limit demand.

In some embodiments, threat monitoring software and/or a threat monitoring service (e.g., a threat intelligence service) using threat intelligence to identify potentially malicious activity can be provided and/or operated by a service provider that also operates the computing environment, or by a third party, to users of the computing environment. Such a threat intelligence service may receive and/or access one or more threat intelligence feeds that contain information about potentially malicious computers on the Internet, such as hosts that serve exploitation tools or malware, botnet command and control hosts, and suspected compromised hosts. Threat intelligence feeds typically contain machine readable tuples of domain names, IPs, indicator types, descriptions, information sources, and other attributes of the identified threat. The threat monitoring software and/or threat intelligence service can be configured by a particular user to compare a set of network events in the user's compute resources to the available threat intelligence feed(s) to find potential security issues. The effectiveness of the threat monitoring software and/or threat intelligence service is governed by the completeness, currency, and accuracy of the available threat intelligence feed(s).

The present disclosure describes a threat intelligence service that can be provided by the computing environment service provider and used by many users simultaneously to monitor network activity associated with each user's computing resources on the computing environment. As described below, the threat intelligence service can create and maintain an IP address tree (and/or other data structures) that can include all IP addresses (and/or other identifying information) that have been identified by the service provider and/or one or more threat information feeds to which the user has subscribed as being associated with potentially malicious activity. In some embodiments, the threat intelligence service can receive threat information from one or more vendors of threat intelligence information as feeds of threat intelligence information, and can receive information indicating which users of the threat intelligence service have subscribed to which feeds. The threat intelligence service can incorporate new and/or updated threat information from the threat intelligence information feeds into the IP address tree (and/or other data structures). For example, some users may subscribe to one or more threat intelligence feeds through an electronic marketplace. In such an example, the threat intelligence feeds can include information on, among other things, IP addresses associated with potentially malicious activity. The marketplace can connect the user to providers of threat intelligence feeds that the user may wish to use to identify potentially malicious activity, and can send subscription information to the threat intelligence service. The threat intelligence service can retrieve the threat intelligence feeds that users have subscribed to, integrate the information into the threat intelligence service, and begin monitoring network activity associated with the user based on the threat intelligence feeds that each user has subscribed to.

In some embodiments, the threat intelligence service can use log information that includes records of network activity associated with a user to determine whether any of the network activity was potentially malicious. For example, the threat intelligence service can check the IP addresses (and/or other identifying information) in the log information against the IP addresses (and/or other identifying information) in the IP address tree (and/or other data structure) associated with threat information to which the user has subscribed to determine whether that IP address (and/or other identifying information) has been identified as being associated with potentially malicious activity. Therefore, in contrast to a "single-tenant" system that provides customized monitoring for a particular user, potentially including the user's own information and source selections, the systems herein provide a "multi-tenant" threat intelligence service that allows some or all of the users in a computing environment to subscribe to various threat intelligence feeds, and monitor activity without being encumbered by administering the collection of threat intelligence feeds and/or the monitoring of the activity.

FIG. 1A depicts an example of a system 100 for providing a subscription-based multi-tenant threat intelligence service in accordance with some embodiments of the disclosed subject matter. As shown in FIG. 1A, in some embodiments, system 100 can include a computing device 102 associated with a user (e.g., "user A") of a compute service. In some such embodiments, the user can be a person (e.g., a developer, a website administrator, an application administrator, etc.) or an entity (e.g., a corporation, a non-profit organization, etc.). Additionally, in some embodiments, computing device 102 can act programmatically to perform one or more actions. Although shown as a single computing device, computing device 102 can be any suitable computing device or combination of devices. Additionally, in some embodiments, actions described herein as being performed by computing device 102 can be performed by one or more virtual machines that are part of a compute service. That is, computing device 102 can be one or more virtual machines that are part of a compute service.

In some embodiments, computing device 102 can access an electronic marketplace 104 through a communication network 106 to select software and/or services that the user wishes to use in connection with the user's compute resources. In some embodiments, a computing device 108 associated with a provider of a feed of threat intelligence information (e.g., "vendor") can interact with electronic marketplace 104 and/or a provider of electronic marketplace 104 to make one or more threat intelligence feeds available to users of electronic marketplace 104 (e.g., for use with a threat intelligence service, as described below). Electronic marketplace 104 can provide a user interface to computing device 102 that can be used to select one or more threat intelligence feeds to which the user of computing device 102 wishes to subscribe. In some embodiments, electronic marketplace 104 can provide any suitable functionality for discovering threat intelligence feeds, and/or any other suitable software and/or service. For example, electronic marketplace 104 can provide search functions, categorizations, recommendations, reviews, filters (e.g., by price, provider, average review, etc.). As another example, electronic marketplace 104 can provide a function to act as an intermediary in a transaction between a user associated with computing device 102 and a provider of a threat intelligence feed associated with computing device 108. In some embodiments, electronic marketplace 104 can provide descriptive information about the various products and/or services offered through the marketplace. In some cases, the information can be information that was provided by a supplier of product and/or service being offered through electronic marketplace 104. Note that, although providers of threat intelligence feeds are generally described herein as vendors, this is not intended to indicate that the provider is selling access to the threat intelligence feed. For example, open source threat intelligence feeds can be listed using marketplace 104, and vendor is intended to include such a provider.

In some embodiments, the threat information provided through a threat intelligence feed can include any suitable threat intelligence information. For example, some organizations compile threat information that identifies potentially malicious actors. In some embodiments, the threat information can include a variety of pieces of information, such as an IP address, domain name, other indicators (e.g., Uniform Resource Locator ("URL"), a file hash, a signature, etc.), descriptive information regarding the threat, identifying information of one or more sources of the information, etc.

In some embodiments, communication network 106 can be any suitable wired network, wireless network, any other suitable network, or any suitable combination thereof. Additionally, communication network 106 can be any suitable personal area network, local area network, wide area network, over-the-air broadcast network (e.g., for radio or television), cable network, satellite network, cellular telephone network, any other suitable type of network, or any suitable combination thereof. For example, communication 106 can be a publicly accessible network of linked networks, in some cases operated by various distinct parties, such as the Internet. In some embodiments, communication network 106 can be a private or semi-private network, such as a corporate or university intranet. Additionally, in some embodiments, communication network 106 can include one or more wireless networks, such as a Global System for Mobile Communications ("GSM") network, a Code Division Multiple Access ("CDMA") network, a Long Term Evolution ("LTE") network, any other suitable wireless network, or any suitable combination of wireless networks. Communication network 106 can use any suitable protocols and/or components for communicating via the Internet and/or any of the other aforementioned types of networks. For example, communication network 106 can use one or more protocols or combinations or protocols, such as Hypertext Transfer Protocol ("HTTP"), HTTPS, Message Queue Telemetry Transport ("MQTT"), Constrained Application Protocol ("CoAP"), etc.

In some embodiments, in response to a user subscribing to a particular threat information feed (e.g., by licensing the information, by paying for access to the information, etc.) using electronic marketplace 104, electronic marketplace 104 can send subscription information 110 regarding the user's new subscription to a message relay service 112 (e.g., via communication network 106). In some embodiments, message relay service 112 can be configured as a first-in first-out storage from which a threat intelligence coordination system 116 included in a threat intelligence computing environment 114 can retrieve subscription information generated by electronic marketplace 104. In some embodiments, threat intelligence coordination system 116 can retrieve subscription information 110 from message relay service 112 in response to any suitable event. For example, in some embodiments, threat intelligence coordination system 116 can periodically (e.g., at regular intervals, at irregular intervals (for example, when resources are available), etc.) retrieve new subscription information from message relay service 112. As another example, threat intelligence coordination system 116 can receive a notification initiated by electronic marketplace 104 indicating that new subscription information is ready to be retrieved.

In some embodiments, threat intelligence coordination system 116 can receive the subscription information 110, a notification from electronic marketplace 104, etc., through a frontend 118. In some embodiments, frontend 118 can receive and process messages from computing device 102, electronic marketplace 104, computing device 108, and/or any other computing device. For example, in some embodiments, frontend 118 can serves as a "front door" to other services provided by threat intelligence computing environment 114. Frontend 118 can process the messages received from various computing devices and/or generated, for example, in response to events (e.g., when electronic marketplace 104 completes a subscription for a particular threat intelligence feed), and can determine whether the messages are properly authorized. For example, frontend 118 can determine whether electronic marketplace 104 associated with the message is authorized to provide subsection information. In some embodiments, frontend 118 can include one or more web servers configured to expose one or more application program interfaces ("APIs") that can receive messages from one or more computing devices 102, electronic marketplace 104, computing device 108, etc., as API calls. In some embodiments, frontend 118 can extract requests from the API call and write them to a data store associated with the threat intelligence service (e.g., electronic data store 126 described below).

In some embodiments, threat intelligence coordination system 116 can create and/or modify one or more entries in a threat intelligence database 120 (or other data structure, such as a file system, etc.) indicating which feeds a user has subscribed to based on subscription information 110 received from electronic marketplace 104.

In some embodiments, when providing information to list a threat intelligence feed using electronic marketplace 104, a user of computing device 108 can provide information (and/or can be provided with information) regarding where the threat information provided as part of the threat intelligence feed is made available. For example, in some embodiments, a user of computing device 108 (e.g., a vendor) can be associated with an electronic data store 122 in which new and/or updated threat information can be stored by the vendor as a mechanism by which access to the threat intelligence feed can be provided. In such an example, electronic data store 122 can be part of the vendor's compute resources (e.g., in connection with a compute service), provided in connection with marketplace 104, provided in connection with threat intelligence computing environment 114, etc. As another example, the threat intelligence information in the feed of threat intelligence information can be provided via download from a particular remote endpoint (e.g., identified by an IP address, a URL, etc.) which can be accessed using credentials that the vendor can provide to threat intelligence coordination system 116 (and/or another component of threat intelligence computing environment 114).

In some embodiments, computing device 108 can grant access to threat information 124 stored in electronic data store 122 to threat intelligence coordination system 116 (and/or any other components of threat intelligence computing environment 114). For example, in some embodiments, a user of computing device 108 can authorize threat intelligence coordination system 116 to access threat information 124 that is stored in electronic data store 122 (e.g., by assigning particular permissions to threat intelligence coordination system 116) and/or can provide information indicating where threat information 124 is stored, such as an address associated with electronic data store 122, identifying information of a storage location of threat information 124, identifying information of threat information 124 (e.g., a path name at which threat information 124 is stored), etc. In some embodiments, electronic data store 122 and threat intelligence coordination system 122 can be provided by the same service provider. In some embodiments, in addition to and/or in lieu of storing threat information 124 in electronic data store 122, computing device 108 can submit threat information 124 to threat intelligence computing environment 114 via an API made available by frontend 118. For example, in some embodiments, computing device 108 can upload a file corresponding to threat information 124 to threat intelligence computing environment 114 via such an API. As another example, computing device 108 can store a portion of threat information 124 in electronic data store 122, and can upload a file corresponding to another portion of threat information (e.g., updated threat information, urgent threat information, information identifying threat information to be removed, etc.) to threat intelligence computing environment 114 via one or more APIs (note that different threat information may be submitted via separate APIs, and/or using different API calls).

In some embodiments, computing device 108 can send a notification to threat intelligence coordination system 116 indicating that new and/or updated threat information (e.g., threat information 124) is available from electronic data store 122. For example, in connection with uploading threat information 124 to electronic data store 122, computing device 108 can transmit a message to threat intelligence coordination system 116 via frontend 118. In some embodiments, the message can include information identifying threat information 124, the location at which threat information 124 is stored, etc.

In some embodiments, threat intelligence coordination system 116 can retrieve threat information 124 as part of a threat intelligence information feed for each feed that has at least one subscriber. Alternatively, in some embodiments, threat information can be retrieved for each threat intelligence feed that is available through electronic marketplace 104 regardless of whether any users have subscribed to the feed. In some embodiments, threat intelligence coordination system 116 can attempt to retrieve new and/or updated threat information at any suitable time and/or in response to any suitable event or combination of events. For example, threat intelligence coordination system 116 can check for new and/or updated threat information at any suitable regular and/or irregular interval. In some embodiments, threat intelligence coordination system 116 can check for new and/or updated information using any suitable technique or combination of techniques. For example, threat intelligence coordination system 116 can check a URL provided by the vendor associated with a particular threat intelligence feed that makes information on the most recent version of a threat intelligence feed available, information on when the threat intelligence feed was last updated available, etc. As another example, threat intelligence coordination system 116 can check electronic data store 122 for timing information and/or version information indicating when threat information was last changed. As yet another example, threat intelligence coordination system 116 can download (or otherwise retrieve) threat information 124 and compare the information to a last version of threat information that was downloaded from the same feed to determine whether there have been any changes.

In some embodiments, threat intelligence coordination system 116 can parse threat information 124 to identify different types of threat information, and/or can reorganize information into a standardized format that can be used by the threat intelligence service. In some embodiments, threat intelligence coordination system 116 can parse threat information 124 to identify one or more IP addresses, domains, URLs, file hashes, etc., and, in some cases, metadata related to the identified information (e.g., descriptions, etc.). In some embodiments, threat intelligence coordination system 116 can use a network-accessible services system to parse the information using one or more functions that can perform such parsing on-demand. For example, threat intelligence coordination system 116 can provide one or more portions of threat information 124 to the network-accessible services system and request that the network-accessible services system execute one or more functions to extract tuples corresponding to individual threats in the threat information, and/or extract particular portions of each tuple of threat information, and organize the parsed threat information into a format useable by threat intelligence coordination system 116. Additionally or alternatively, in some embodiments, threat information 124 as provided can be formatted (e.g., by computing device 108 and/or any other suitable computing device(s)) to facilitate ingestion by threat intelligence coordination system 116 prior to being provided to threat intelligence coordination system 116. As another example, in some embodiments, threat intelligence coordination system 116 can search threat information 124 for tuples (e.g., by searching for particular characters or combinations of characters, such as commas, semicolons, spaces, etc.; by searching for particular strings of text, etc.) corresponding to individual threats, and can extract particular information from each tuple (e.g., an IP address, a domain name, a URL, descriptions, indicator types, file hashes, etc.) such that the information can be used by a threat intelligence service (e.g., as described below) to build a data structure (e.g., an in-memory IP address tree) and/or provide descriptive information to a user about a potential threat when the threat intelligence service identifies potentially malicious activity. In some embodiments, threat intelligence coordination system 116 can use a different parser for each different format of threat intelligence feed that is available through electronic marketplace 104.

In some embodiments, threat intelligence coordination system 116 can create and/or modify one or more entries in threat intelligence database 120 corresponding to threat information 124. In some embodiments, such an entry or entries can include a status of threat information 124 indicating whether the information contained in threat information 124 has been integrated into the threat intelligence service. Additionally, in some embodiments, threat intelligence coordination system 116 can use threat intelligence database 120 to store metadata from threat information 124 that is associated with a particular IP address, domain, URL, etc. Additionally, in some embodiments, threat intelligence coordination system 116 can use threat intelligence database 120 to store information regarding which user(s) has subscribed to which threat intelligence feeds.

In some embodiments, threat intelligence coordination system 116 can provide threat information 124 to an electronic data store 126 that is associated with a threat intelligence service 128. Threat intelligence service 128 can use threat information 124, such as IP addresses, domains, URLs, etc., to build and/or update a data structure that can be used to determine whether activity associated with a user is suspected of being malicious (e.g., as described below in connection with an in-memory IP address tree and FIG. 1B).

In some embodiments, computing device 102 (and/or any other suitable computing device associated with and/or otherwise being used by user A) can create log information 130 about activity by computing device 102 and/or any other suitable computing devices associated with computing device 102 (e.g., computing devices associated with user A). For example, if computing device 102 (and/or a user of computing device 102) is associated with one or more compute service, one or more services (e.g., provided by the same service provider that provides threat intelligence service 128), one or more accounts, etc., log information 130 can record activity associated with the user account(s) and/or the compute service. In a more particular example, computing device 102 can be associated with a virtual network that can use one or more compute service to execute one or more applications, provide one or more services, store information, etc. In such a more particular example, the log information can include IP addresses that have sent (and/or attempted to send) information to part of the virtual network, IP addresses to which the virtual network has sent (and/or attempted to send) information, URLs from which computing device 102 and/or the virtual network have requested information, domains which computing device 102 and/or the virtual network have visited, any other identifying information of a remote endpoint which sent (and/or attempted to send) information to part of the virtual network and/or to which the virtual network has sent (and/or attempted to send) information, etc. In some embodiments, a remote endpoint can be any computing device that is located outside of the user's compute resources and, in some cases, not associated with the service provider of the threat intelligence service. For example, a remote endpoint can be a personal computer, a tablet computer, a smartphone, a server, etc., that communicates (and/or attempts to communicate) with the user's compute resources from an IP address that is not within a subnet associated with the user's compute resources (which may include one or more subnets associated with the user, but not provided by the compute service, e.g., corresponding to a corporate intranet associated with the user).

In some embodiments, compute resources associated with a user (e.g., computing device 102 associated with user A) can be associated with a virtual machine and a corresponding virtualization system, which can implement communication managers configured to process incoming and outgoing data communications for the virtual machines. In some embodiments, the virtualization system can include a hypervisor and a Dom0. Additionally, in some embodiments, each virtualization system can implement data logging functionality configured to analyze incoming and outgoing data communications and generate log entries describing attributes of those data communications. For example, log entries can include the sources and destinations of data communications, source and destination ports for the data communication, an identification of a virtual network interface of the virtualization system on which the data communication was received and/or transmitted, a size of the data communication, a time that the data communication was received and/or transmitted, an identification of a product instantiated into the virtual machine to which the data communication was transmitted or from which the data communication was received, and/or any other suitable information. In a more particular example, the data logging functionality can run in the Dom0 or elsewhere, such as on a network card attached to the server hosting the virtual machine. In some embodiments, as the virtualization systems associated with the user (e.g., user A) process data communications to generate log entries, the contents of those log entities can be transmitted to a logging service (not shown) for storage. The data communication can be passed to the virtual machine via the virtualization system for processing. For example, the virtualization system can generate one or more log entries describing the reception and/or transmission of the data packet by the virtualization system. The one or more log entries can then be transmitted to the logging service by the virtualization system for storage. In some embodiments, computing device 102 and/or threat intelligence service 126 can request log information 122 from the logging service (e.g., through an API associated with the logging service). As described below in connection with FIG. 3, computing device 102 can use a cache to track log information that has been recently submitted to threat intelligence service 128, and can inhibit log information (e.g., corresponding to a new log entry) from being submitted that is duplicative of a log information (e.g., a previously submitted log entry) that has recently been submitted to threat intelligence service 128. In some embodiments, log information 130 can include one or more log entries, one or more items of information extracted from one or more log entries (and, in some cases, not the log entries themselves), one or more items corresponding to information (e.g., IP addresses) that appears at least once in a group of one or more log entries, etc.

Additionally, in some embodiments, log information 130 can include IP addresses, identifying information, etc., associated with a request to one or more services associated with a service provider of threat intelligence service 128 (and/or one or more other service providers). For example, the information can include IP addresses from which API calls were made to a service using account information associated with a user of computing device 102 (e.g., user A). In some embodiments, log information related to activity by computing device 102 (e.g., communication to and/or from a virtual network) and, in some cases, other computing devices associated with the user of computing device 102, can be maintained separately from log information related to API calls from user accounts associated with computing device 102. In some embodiments, such log information (or one or more portions of the log information) can be stored in any suitable location(s), such as an electronic data store associated with a user of computing device 102, and/or an electronic data store associated with the provider of services used by computing device 102.

In some embodiments, computing device 102 can provide log information 130 to threat intelligence service 128 at any suitable time. For example, computing device 102 can provide log information 130 at regular intervals (e.g., every five minutes, every ten minutes, etc.). As another example, computing device 102 can provide log information 130 at irregular intervals (e.g., when a threshold amount of log information has been generated). Note that, although computing device 102 is described herein as providing log information 130, this is merely an example and log information 130 can be provided by any suitable computing device or combination of computing devices associated with the user. For example, in some embodiments, log information 130 can be provided by an underlying physical computing device on which computing device 102 (and/or any other computing devices associated with the user) is being executed as a virtual machine or as part of a virtual machine. For example, if computing device 102 is provided using a virtual machine, instructions (e.g., a program) being executed outside the virtual machine can generate and/or provide the log information. In a more particular example, a virtualization system can provide log information 130 to threat intelligence service 128. In some embodiments, a logging service can provide log information 130 to threat intelligence service 128.

In some embodiments, computing device 102 can provide log information 130 to threat intelligence service 128 using any suitable technique or combination of techniques. For example, in some embodiments, computing device 102 can send a file corresponding to at least a portion of log information 130 to threat intelligence service 128 via an API made available by frontend 118. As another example, computing device 102 can provide log information 130 to a message relay service, which can be accessed by threat intelligence service 128 for newly submitted log information. In such an example, the message relay service can be configured as a first-in first-out storage from which the oldest log information is sent to threat intelligence service 128 (e.g., in response to a request from threat intelligence service 128 for log information via frontend 118 and/or communication network 106).

In some embodiments, a load balancer (not shown) can distribute log information 130 provided by computing device 102 and/or log information received from any other source among different computing devices used by threat intelligence service 128 to parse and/or check the log information for potentially malicious activity. For example, the load balancer can distribute log information to be analyzed among a group of computing devices (e.g., physical servers, virtual machine instances, containers, etc.) that have a replica of at least a portion of an in-memory IP address tree (and/or other suitable data structure). In some embodiments, the load balancer can determine the availability and/or workload of at least a portion of computing devices executing a portion of threat intelligence service 128 (e.g., computing devices in the same region as the load balancer), and can route requests based on the workload of the various computing devices. Additionally, in some embodiments, the load balancer can stop routing log information to computing devices that are not responsive and/or are otherwise not processing log information that has previously been sent. In some embodiments, the load balancer can resend log information that was sent to a computing device that has become non-responsive. In some embodiments, the load balancer can send an alert (e.g., to an administrator of threat intelligence service 128) to indicate that a particular computing device is not processing log information.

Figure 1B:
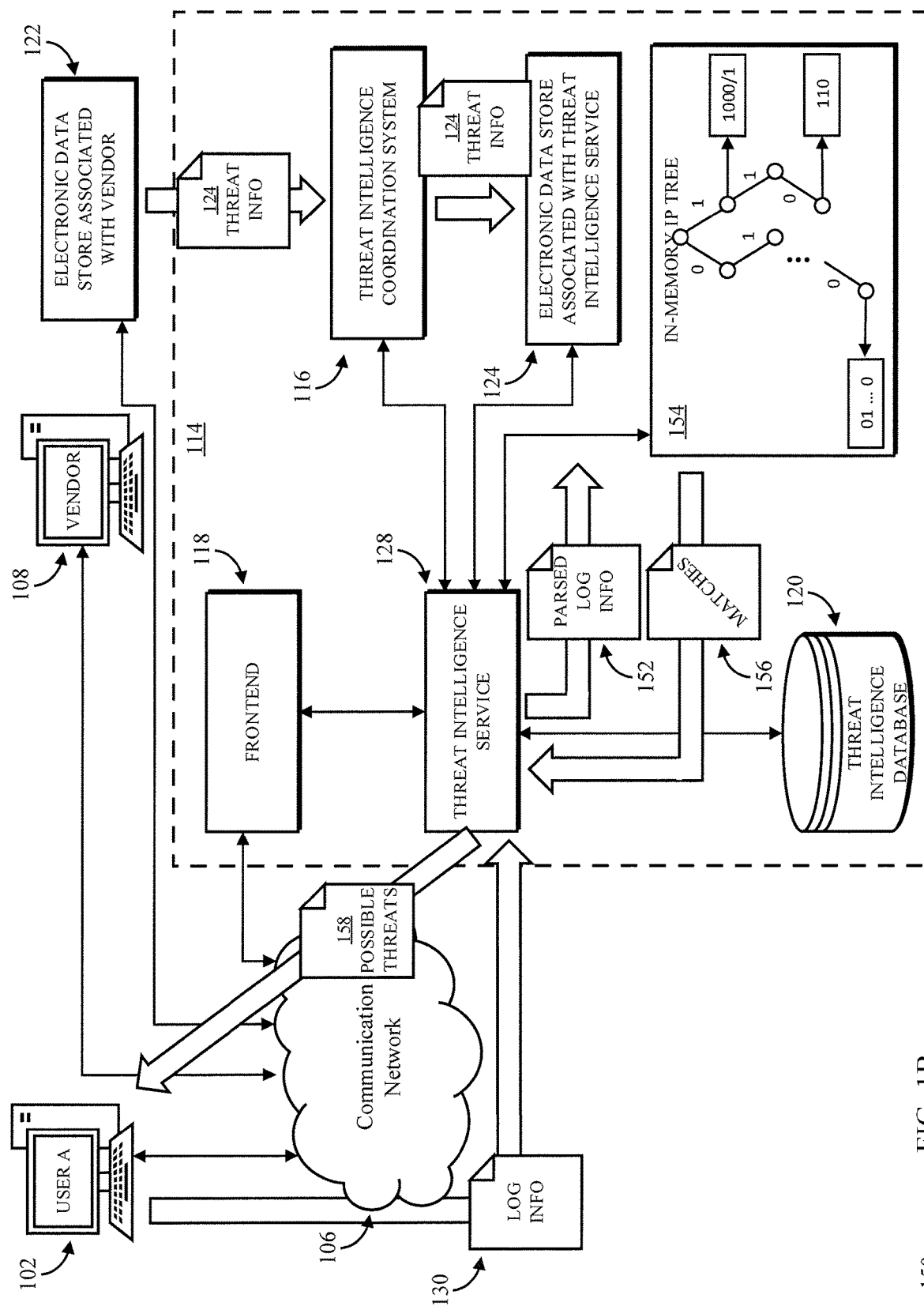

FIG. 1B depicts an example of a system 150 for providing a subscription-based multi-tenant threat intelligence service in accordance with some embodiments of the disclosed subject matter. As shown in FIG. 1B, threat intelligence service 128 can receive log information 130, and threat intelligence service 128 can parse the received log information 130 to extract identifying information (e.g., IP addresses, URLs, domains, etc.). In some embodiments, threat intelligence service 128 can parse the log information 130 using any suitable technique or combination of techniques, producing parsed log information 152. For example, in some embodiments, threat intelligence service 128 can extract any IP addresses in log information 130 using any suitable technique or combination of techniques to identify IP addresses in log information 130. In a more particular example, threat intelligence service 128 can cause text in log information 122 to be searched for a string of characters corresponding to an IP address (e.g., an IPv4 IP address, an IPv6 IP address, etc.). In some embodiments, threat intelligence service 128 can use a network-accessible services system to parse the log information 130. For example, threat intelligence service 128 can provide one or more portions of log information 130 to the network-accessible services system and request that the network-accessible services system execute one or more functions to extract and return IP addresses (and/or any other suitable identifying information) present in log information 130. Additionally or alternatively, in some embodiments, the log information 130 as provided can be formatted (e.g., by computing device 102 and/or any other suitable computing device(s)) to facilitate ingestion by threat intelligence service 128 prior to being provided to threat intelligence service 128. For example, log information 130 can be formatted as a string of comma separated values, where each value corresponds to an IP address (or other identifying information) to be analyzed.

In some embodiments, threat intelligence service 128 can check, for each IP address represented in parsed log information 152, whether the IP address is associated with threat information in a threat intelligence feed to which the user is subscribed associated (and/or threat information that is provided by threat intelligence service 128 itself). For example, for each IP address represented in parsed log information 152, threat intelligence service 128 can traverse the nodes of an in-memory IP address tree 154 to determine whether any of the nodes are associated with threat information that is pertinent to the user associated with computing device 102 (i.e., user A).

As shown in FIG. 1B, in-memory IP address tree 154 can include any suitable number of nodes that each represent a unique IP address and/or a group of IP addresses (e.g., a group of IP addresses identified as 1.0.0.0/1 in CIDR notation). As shown in FIG. 1B, in-memory IP address tree 154 can be structured such that threat intelligence service 128 can determine whether a particular IP address is represented in the IP tree (e.g., by performing a bit comparison at each level of the tree to determine whether the tree includes a particular IP address). In some embodiments, based on threat information 124, threat intelligence service 128 can add any nodes to in-memory IP address tree 154 that do not already exist, and can associate information with each node that represents an IP address in threat information 154 with information indicating that the IP address is associated with one or more threat intelligence feeds and/or that user A has subscribed to a threat intelligence feed which included the IP address. Additionally, in some embodiments, threat intelligence service 128 can associate information with each of those nodes with other information (e.g., descriptive information from threat information 154 about the IP address, etc.). Additionally or alternatively, threat intelligence service 128 can associate information identifying a database entry (or entries) corresponding to additional information about the IP address that was submitted by user A. Such a database entry in threat intelligence database 120 can be accessed to prepare information for user A related to activity associated with that IP address.

In some embodiments, in-memory IP address tree 154 can represent IP addresses associated with threat information that is universal to all users. For example, threat intelligence service 128 can have access to threat information that is not necessarily associated with any particular user or vendor threat intelligence feed available through electronic marketplace 104. Such information can be generated by a service provider of threat intelligence service 128 and/or can be acquired from any suitable source (e.g., third party providers of threat information, sensors deployed to capture information about malicious activity, etc.).

In some embodiments, in-memory IP address tree 154 can represent IP addresses associated with any suitable threat intelligence feeds. For example, in some embodiments, in-memory IP address tree 154 can represent IP addresses for all threat intelligence feeds subscribed to by any user of threat intelligence service 128 in a particular geographic area, availability zone, etc. As another example, in some embodiments, in-memory IP address tree 154 can represent IP addresses associated with all users of threat intelligence service 128, including IP addresses included in all feeds subscribed to by at least one user, IP addresses submitted by users (e.g., in a whitelist, in a blacklist,), IP addresses included in universal threat information, etc. In some such embodiments, each node in in-memory IP address tree 154 can be associated with any suitable amount of information identifying which threat intelligence feed includes that IP address. In some embodiments, in-memory address tree 154 can be replicated across any suitable number of computing devices that can be used by threat intelligence service 128 to identify potentially malicious activity. For example, in some embodiments, in-memory address tree 154 can be replicated across any suitable number of servers, virtual machine instances, containers, etc., that can each be used by threat intelligence service 128 to determine whether a submitted IP address is present in in-memory IP address tree 154 and whether the user is associated with a feed that included the IP address (and/or whether the IP address matches an IP address from universal threat information). Note that, in some embodiments, the number of computing devices hosting a replica of in-memory IP address 154 can be scaled (e.g., increased or decreased) based on the number of requests being received by threat intelligence service 128. Further, in some embodiments, the number of replicas can vary by region (e.g., geographic region, availability zone, data center, etc.), and can scale independently based on the number of requests being received in that region. Additionally, in some embodiments, in-memory address tree 154 can correspond to users of treat intelligence service 154 that have compute resources in a first geographic region (or availability zone, data center, etc.), and can exclude information related to users of threat intelligence service 128 that have compute resources in other regions, but that do not have any compute resources in the first geographic region. For example, in-memory IP address tree 154 can include IP addresses in threat information from a first vendor subscribed to by a first user that has compute resources in the first geographic region and information indicating that the IP addresses are associated with the first user, but can exclude information indicating that the IP addresses are associated with a second user that also subscribes to the first vendor when the second user does not have any compute resources in the first geographic region.

In some embodiments, electronic data store 126 (and/or any other suitable electronic data stores) can store universal threat information and threat information received from users of threat intelligence service 128. In some such embodiments, in-memory IP address tree 154 can be a representation of IP addresses included in current versions of the threat information in electronic data store 126. Additionally, in some embodiments, threat intelligence service 128 can create and/or recreate in-memory IP address tree 154 based on the threat information stored in electronic data store 126.

In some embodiments, as users may subscribe to multiple threat intelligence feeds that include the same IP addresses (and/or other identifying information), threat intelligence service 128 (and/or threat intelligence coordination system 116) can create information (e.g., a database entry) for a particular IP address in a received threat information file if it does not exist, and can reference existing information (e.g., the existing database entry) for that IP address if it already exists.

As described below in connection with FIG. 2, in-memory IP address tree 154 can be read-only, and a modifiable version of in-memory IP address tree 154 can be modified when new and/or updated threat information is received as part of one or more threat intelligence feeds (e.g., from computing device 108 associated with a vendor). The read-only version can then be replaced by the modified version, and a new modifiable version can be created (or the modifiable version can be copied as a read-only version).

In some embodiments, threat intelligence service 128 can identify matching IP addresses 156 for which threat information was present in in-memory IP address tree 154. Matching IP addresses 156 can include information indicating which threat intelligence feed(s) provided the threat information (e.g., threat information 124) which included the IP address, metadata about the IP address (e.g., from threat information 124), etc. Additionally or alternatively, matching IP addresses 156 can include identifying information of one or more entries in threat intelligence database 120 corresponding to the matching IP address and the threat information that is relevant to the threat intelligence feed which supplied the threat information.

In some embodiments, threat intelligence service 128 can provide a report 158 about possible threats to the services and/or accounts associated with the user of computing device 102. For example, threat report 158 can include IP addresses that were identified as potentially being malicious, information about the IP address and/or why it was identified as malicious (e.g., information that was included in threat information 124), what action(s) were associated with the IP address (e.g., was information sent from that IP addresses and/or to that IP address, was an API call made from that IP address and which account information was used to submit the API call, etc.). In some embodiments, threat intelligence service 128 can expose one or more APIs (e.g., via frontend 118) to which a user of computing device 102 can submit requests to threat intelligence service 128 to configure when, how, and/or in what format threat intelligence service 128 provides threat report 158. For example, computing device 102 can submit an API call to frontend 118 to cause threat intelligence service 128 to send threat report 158 each time potentially malicious activity is detected, when a particular number of potentially malicious activities have been detected, at predetermined periods, etc. As another example, computing device 102 can submit an API call to frontend 118 to cause threat intelligence service 128 to send threat report 158 using particular communication channels (e.g., email, push notifications, an http message to a port and/or IP address of a web server identified by the API call) and/or to otherwise make threat report 158 available (e.g., by updating a data base accessible by the user, updating a file accessible by the user, etc.).

Additionally, in some embodiments, threat intelligence service 128 can take one or more actions based on the matching IP addresses 156. For example, in some embodiments, threat intelligence service 128 can (with explicit permission granted by the user) block computing device 102 (and/or any other suitable computing device(s) associated with the user) from sending information to that IP address and/or receiving information from that IP address. In a more particular example, threat intelligence service 128 can create and/or update a security policy associated with computing device 102 on behalf of the user of computing device 102 to block communication with the IP address (e.g., by sending a request to an API associated with a compute service that provides access to computing device 102 to block communications with the IP address). In another more particular example, threat intelligence service 128 can cause a Dom0 associated with computing device 102 to update the IP addresses blocked by a firewall being executed by the physical computing device executing a virtual machine providing access to computing device 102 (e.g., using a program such as iptables). As yet another more particular example, threat intelligence service 128 can create and/or update a set of network security rules (sometimes referred to as a security group) associated with one or more physical and/or virtual network interfaces (e.g., by submitting a request to an API associated with a service that provides computing device 102, such as a compute service) used by computing device 102 (and/or any other suitable computing devices associated with the user) to block communication to and/or from the IP address using a network interface using the security group. In such an example, the security group can be a security group already associated with the network interface, and/or can be a new security group created by threat intelligence service 128 and associated with the network interface(s). In some embodiments, threat intelligence service 128 can create and/or update a security policy that includes an IP address identified as being potentially malicious in threat information 124 associated with the user and/or in universal threat information, prior to receiving log information 130. In such embodiments, a user can choose to implement the security policy created by threat intelligence service 128 to preemptively block communication to and/or from IP addresses (and/or endpoints identified by other identifying information).

As another example, threat intelligence service 128 can suspend access by an account used to submit an API call from a suspected malicious IP address and/or otherwise revoke access by the account. In a more particular example, in some embodiments, threat intelligence service 110 can submit a request to an API associated with a service that maintains and/or verifies credentials to suspend permissions for the account. In some embodiments, a user associated with computing device 102 can be required to grant permissions to threat intelligence service 128 to take actions to block communications from particular endpoints on behalf of the user. In some embodiments, threat intelligence service 128 can expose one or more APIs (e.g., via frontend 118) to which a user of computing device 102 can submit requests to threat intelligence service 128 to take an action (e.g., by creating and/or updating security policies, causing an IP address to be blocked by a firewall, etc.) on behalf of the user based on IP addresses included in threat information 124 (and/or universal threat information) without further user intervention. For example, computing device 102 can submit an API call to frontend 118 to cause threat intelligence service 128 to block an IP address in response to threat information 124 indicating that the IP address is associated with malicious activity with a particular level of confidence (e.g., high confidence).

Although threat intelligence service 128 is generally described as identifying potentially malicious IP addresses from log information 130 using in-memory IP address tree 154, this is merely an example, and any suitable identifying information related to network activity can be identified. For example, URLs and/or domains can be identified using a hash table in which each URL and/or domain received in threat information (e.g., threat information 124) corresponds to an output of a hash function. In such an example, each URL and/or domain in log information 130 can be hashed using the hash function and compared against outputs corresponding to threat information to determine whether any of the URLs and/or domains in log information 130 is associated with potentially malicious activity. As another example, URLs and/or domains can be identified using a prefix tree in which top level domains are at the roots, and successive parts of a domain name branch at each level. In a more particular example, if threat information includes the domains http (colon)//www (dot) example (dot) com, and https (colon)//example1 (dot) net, the prefix tree can include roots for top level domains ".com" and ".net," with hierarchies descending such that the second-level domain name "example" forms a node below ".com" and "example1" forms a node below ".net," and so on. As yet another example, in addition to or in lieu of the in-memory IP address tree, IP addresses, domain names, etc., can be maintained in a relational database and/or non-relational database using the identifying information (or, e.g., a hash of the identifying information) as a key.

As still another example, any other activity can be included in threat information received as part of a threat intelligence feed and/or as part of log information associated with a user. In a more particular example, signatures of files uploaded to and/or downloaded by computing device 102 (and/or any other suitable computing device associated with the user) can be received in log information and compared to corresponding threat information. As another more particular example, other process activity such as database queries submitted to computing device 102 (and/or any other suitable computing device associated with the user), state changes (e.g., registry keys, settings, credentials, permissions, etc.) to computing device 102 (and/or any other suitable computing device associated with the user), etc. Such information can be checked against threat information using any suitable data structure. In some embodiments, the data structure used by the threat intelligence service can be replicated across computing devices (which can be physical devices and/or virtual devices) in physically and/or logically separated regions to provide increased availability, redundancy, bandwidth, etc., for users associated with compute resources in each region. Note that the data structure can correspond to threat information associated with a large number of users (e.g., hundreds, thousands, hundreds of thousands, etc.), and can be used (e.g., by the threat intelligence service) to monitor potential threats to each of the users by evaluating log information corresponding to activity associated with the user. Such log information from such large numbers of users can require a fleet of machines that each provide at least a portion of the functionality of threat intelligence service 128.

Figure 2:
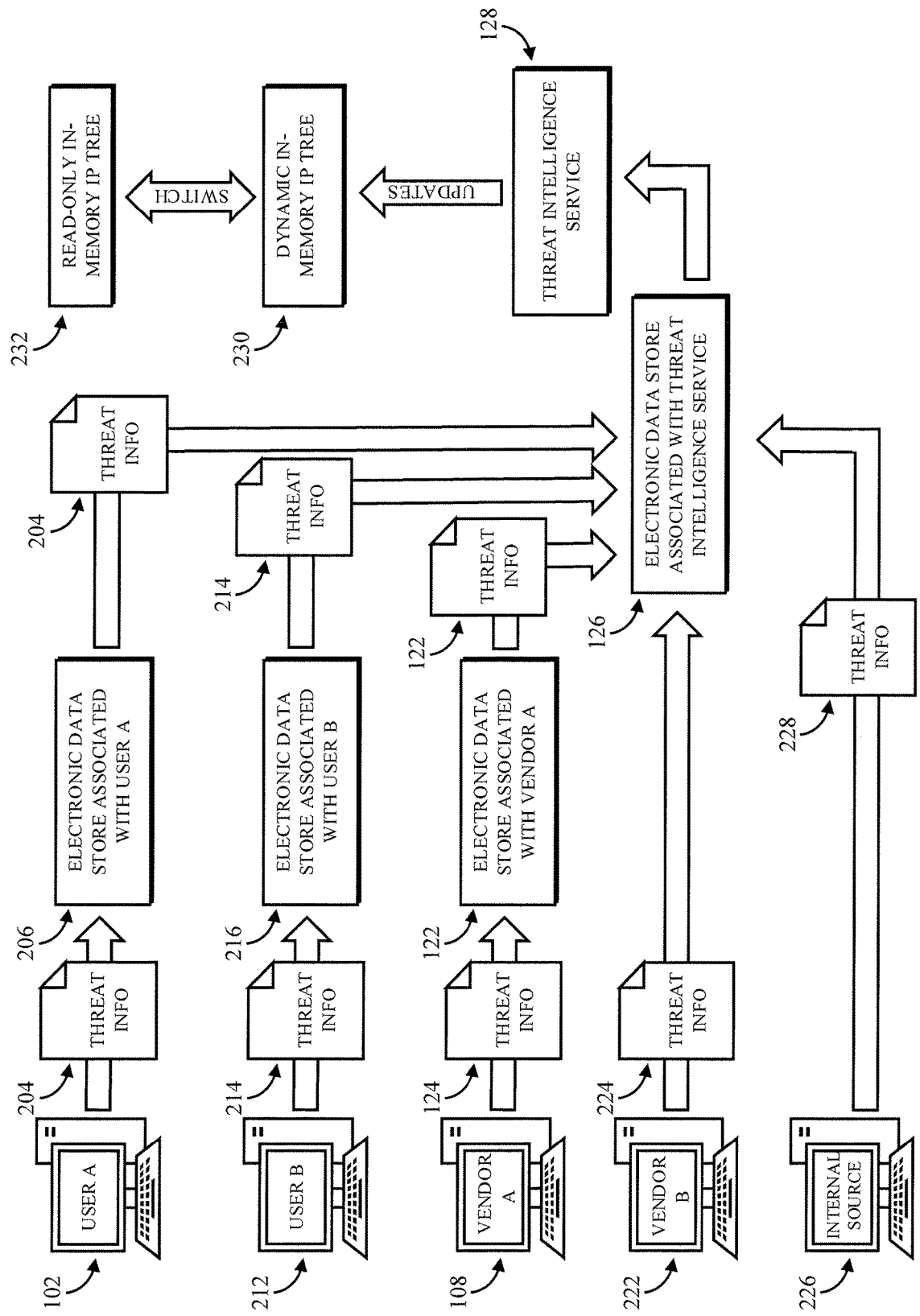
FIG. 2 is a diagram of an example system for processing multiple sources of threat information that can be used to generate an in-memory IP address tree in accordance with some embodiments of the disclosed subject matter.

FIG. 2 shows an example 200 of multiple sources of threat information that can be used to generate an in-memory IP address tree (or any other suitable data structure) in accordance with some embodiments of the disclosed subject matter. As shown in FIG. 2, threat intelligence service 128 can retrieve threat information 204, 214 stored in electronic data store 206, 216 and/or threat intelligence data store 126 by computing devices 102, 212 associated with various users user accounts (e.g., as user-specific threat intelligence). Additionally, threat intelligence service 128 can retrieve threat information 124, 224 stored in electronic data store 122 and/or threat intelligence data store 126 by computing devices 108, 222 associated with various vendors (e.g., threat intelligence feed information). In some embodiments, a computing device 226 can submit universal threat information 228 that may include overlapping and/or different threat information than is included in threat information 124, 204, 214, 224. For example, a first vendor (e.g., "vendor A") associated with computing device 108 can upload threat information 124 to electronic data store 122 associated with vendor A, and can indicate to threat intelligence service 126/threat intelligence coordination service 116 that new and/or updated threat information has been stored in electronic data store 122, while a second vendor (e.g., "vendor B") associated with computing device 222 can upload threat information 224 to electronic data store 126 associated with threat intelligence service 126 directly (e.g., through an API provided by frontend 118, by an API associated with electronic data store 126, through message relay service 112, etc.), and can indicate to threat intelligence service 126/threat intelligence coordination service 116 that new and/or updated threat information has been stored in electronic data store 126. As described above in connection with threat information 124 of FIGS. 1A and 1B, threat intelligence service 126 can use threat information 124, 224 to identify which IP addresses to add to an in-memory IP address tree (e.g., in-memory IP address tree 154).

In some embodiments, threat intelligence service 126 can use other information to create at least a portion of an in-memory IP address tree (e.g., in-memory IP address tree 154) that can be used to determine whether activity associated with a particular user (e.g., user A, user B, etc.) is potentially malicious. For example, a computing device 226 associated with an internal provider (e.g., a security group staffed by the provider of threat intelligence service 126) of threat information (e.g., threat information 228) can upload the threat information to an electronic data store 126 associated with threat intelligence service 126. In some embodiments, threat intelligence service 126 can use information created by the service provider to create at least a portion an in-memory IP address tree (e.g., in-memory IP address tree 154) that can be used to determine whether activity associated with a particular user (e.g., user A, user B, etc.) is potentially malicious. For example, the service provider can deploy sensors (e.g., honeypots) and record resulting network activity that indicates intrusions, etc.

In some embodiments, as threat information is received, threat intelligence service 126 can generate and/or modify a dynamic in-memory IP address tree 230 by adding and/or removing nodes, associating and/or disassociating information with one or more nodes based on the received threat information, etc. Additionally, in some embodiments, threat intelligence service 126 can use a read-only in-memory IP address tree 232 to determine whether any potentially malicious activity has been recorded for a user (e.g., based on log information 130). In some embodiments, read-only in-memory IP address tree 232 can be updated with the changes made to dynamic in-memory IP address tree 230 at any suitable intervals and/or in response to any suitable event(s). For example, read-only in-memory IP address tree 232 can be updated every five minutes, ten minutes, fifteen minutes, or any other suitable amount of time. As another example, read-only in-memory IP address tree 232 can be updated when at least a threshold number of changes have been made to dynamic in-memory IP address tree 230. In some embodiments, the changes to read-only in-memory IP address tree 232 can be made using any suitable technique or combination of techniques. For example, dynamic in-memory IP address tree 230 can be made read-only, and can take the place of read-only in-memory IP address tree 232, which can be replaced by a copy of dynamic in-memory IP address tree 230. In such an example, the in-memory address trees can switch back and forth from being read-only to modifiable and back. As another example, the changes to read-only in-memory IP address tree 232 can be made by replacing the configuration of read-only in-memory IP address tree 232 with the current configuration of dynamic in-memory IP address tree 230.

In some embodiments, read-only in-memory IP address tree 232 can be replicated across different geographic regions, availability zones, etc., such that regardless of where the log information is received from a user, threat intelligence service 126 in that region, availability zone, etc., can determine whether the log information includes suspected malicious activity.

Figure 3:
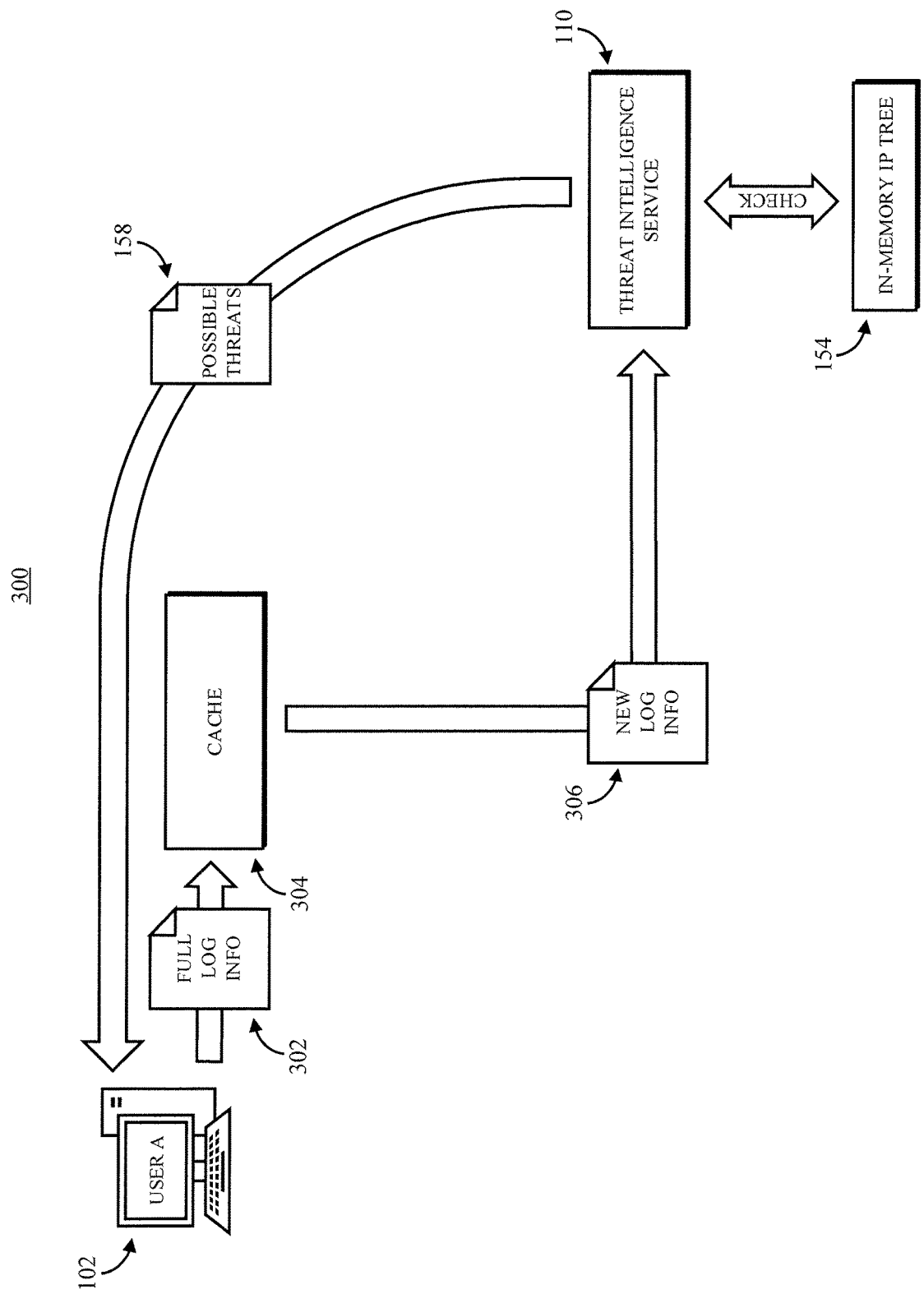
FIG. 3 is a diagram of an example system for providing log information from a computing device associated with a user to the threat intelligence service in accordance with some embodiments of the disclosed subject matter.

FIG. 3 shows an example of a portion of a system 300 for providing log information from a computing device (e.g., computing device 102) associated with a user to the threat intelligence service 110 in accordance with some embodiments of the disclosed subject matter. As shown in FIG. 3, computing device 102 can compare log information 302 that has not been provided to threat intelligence service 126 to a cache 304 of log information that has recently been provided to threat intelligence service 126. For example, computing device 102 can use cache 304 to store log information that has been sent to threat intelligence service 110 in the last hour, two hours, 12 hours, 24 hours, 48 hours, etc. In some embodiments, cache 304 can be any suitable electronic data store, and can be provided as a service by the service provider of threat intelligence service 126 (or any other suitable service provider). Additionally or alternatively, cache 304 can be part of a physical computing device controlled by a user of computing device 102.

In some embodiments, based on the comparison of the log information 302 to log information in cache, computing device 102 can provide new log information 306 that includes, for example, IP addresses from log information 302 that do not appear in cache 304. As described above in connection with FIGS. 1A and 1B, new log information 306 can be provided to threat intelligence service 126 by computing device 102 (and/or any suitable source). Threat intelligence service 126 can compare new log information 306 to in-memory IP address tree 154 to determine whether there are any matching IP addresses, and can provide threat report 158 based on any matches. In some embodiments, providing only new log information can reduce the amount of log information that threat intelligence service 126 is requested to process, which can, in some cases, increase the speed with which potentially malicious activity can be identified, and/or can increase the number of users that can be served.

Figure 4:
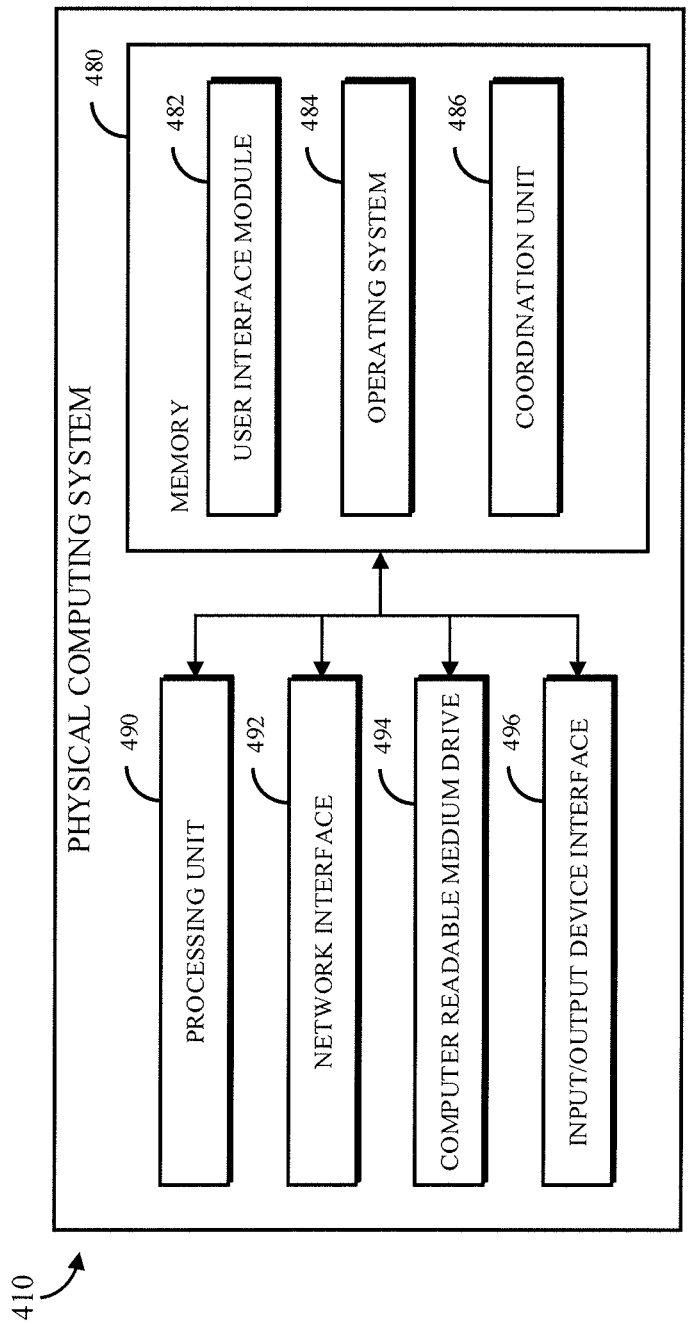
FIG. 4 is a diagram of an example general architecture of a computing system that determines whether activity of users computing systems and/or user accounts are associated with network information (e.g., an IP address) that has been identified as potentially being malicious in accordance with some embodiments of the disclosed subject matter.

FIG. 4 shows an example of a general architecture of a physical computing device 410 (e.g., a server) that can be used to provide access to at least a portion of the mechanisms described herein (e.g., as a portion of threat intelligence coordination system 116, as a portion of threat intelligence service 128, etc.) to coordinate threat intelligence feed information and/or subscription information regarding which user(s) have subscribed to which threat intelligence feeds, determine whether activity of users computing systems and/or user accounts are associated with network information (e.g., an IP address) that has been identified as potentially being malicious, etc., in accordance with some embodiments of the disclosed subject matter. The general architecture of physical computing device 410 depicted in FIG. 4 includes an arrangement of computer hardware and/or software modules that can be used to implement aspects of the disclosed subject matter. The hardware modules may be implemented with physical electronic devices, as described below, and physical computing device 410 can include many more (or fewer) elements than those shown in FIG. 4. It is not necessary, however, that all of these generally conventional elements be shown in order to provide an enabling disclosure. Additionally, the general architecture illustrated in FIG. 4 may be used to implement one or more of the other components illustrated in FIGS. 1A and 1B. As illustrated, physical computing device 410 includes a processing unit 490, a network interface 492, a computer readable medium drive 494, and an input/output device interface 496, all of which can communicate with one another by way of a communication bus. Network interface 492 can provide connectivity to one or more networks or computing systems. The processing unit 490 can thus receive information and instructions from other computing systems or services via communication network 106. Processing unit 490 can also communicate to and from memory 480 and further provide output information for an optional display (not shown) via the input/output device interface 496. The input/output device interface 496 can also accept input from one or more optional input device (not shown).

Memory 480 can contain computer program instructions (e.g., grouped as modules in some embodiments) that processing unit 490 executes in order to implement one or more aspects of the disclosed subject matter. In some embodiments, memory 480 can include RAM, ROM, EEPROM, one or more flash drives, one or more hard disks, one or more solid state drives, one or more optical drives, etc., any other suitable persistent, auxiliary, or non-transitory computer-readable media, or any suitable combination thereof. Memory 480 can store an operating system 484 that provides computer program instructions for use by processing unit 490 (e.g., in the general administration and operation of threat intelligence coordination system 116, threat intelligence service 128, etc.). Memory 480 can further include computer program instructions and other information for implementing aspects of the disclosed subject matter. For example, in some embodiments, memory 480 can include a user interface module 482 that generates user interfaces (and/or instructions therefor) for display upon a computing device, e.g., via a navigation and/or browsing interface such as a browser or application installed on the computing device. In addition, memory 480 can include and/or communicate with one or more data repositories (not shown), for example, to retrieve threat information, subscription information, program codes, libraries, etc.

In some embodiments, memory 480 can include a threat intelligence coordination unit 486 that may be executed by processing unit 490 to provide at least a portion of computing environment 114. For example, in some embodiments, physical computing device 410 can execute a virtual machine instance that can use threat intelligence coordination unit 486 to implement at least a portion of threat intelligence coordination system 116. In a more particular example, as described below in connection with FIG. 5, threat intelligence coordination unit 486 can include one or more software images that can be used by a virtual machine instance to implement a portion of threat intelligence coordination system 116 (e.g., by receiving subscription information indicating that a particular user subscribes to a particular threat intelligence feed, by receiving threat information from one or more vendors, by checking for updated threat intelligence information from a particular vendor, by retrieving threat information from a particular vendor, by updating threat information to be used by threat intelligence service 128, etc.). In some embodiments, threat intelligence coordination system 116 and/or threat intelligence service 128 can be implemented using any suitable number of physical computing devices (e.g., physical computing device 410) in any suitable locations.

Figure 5:
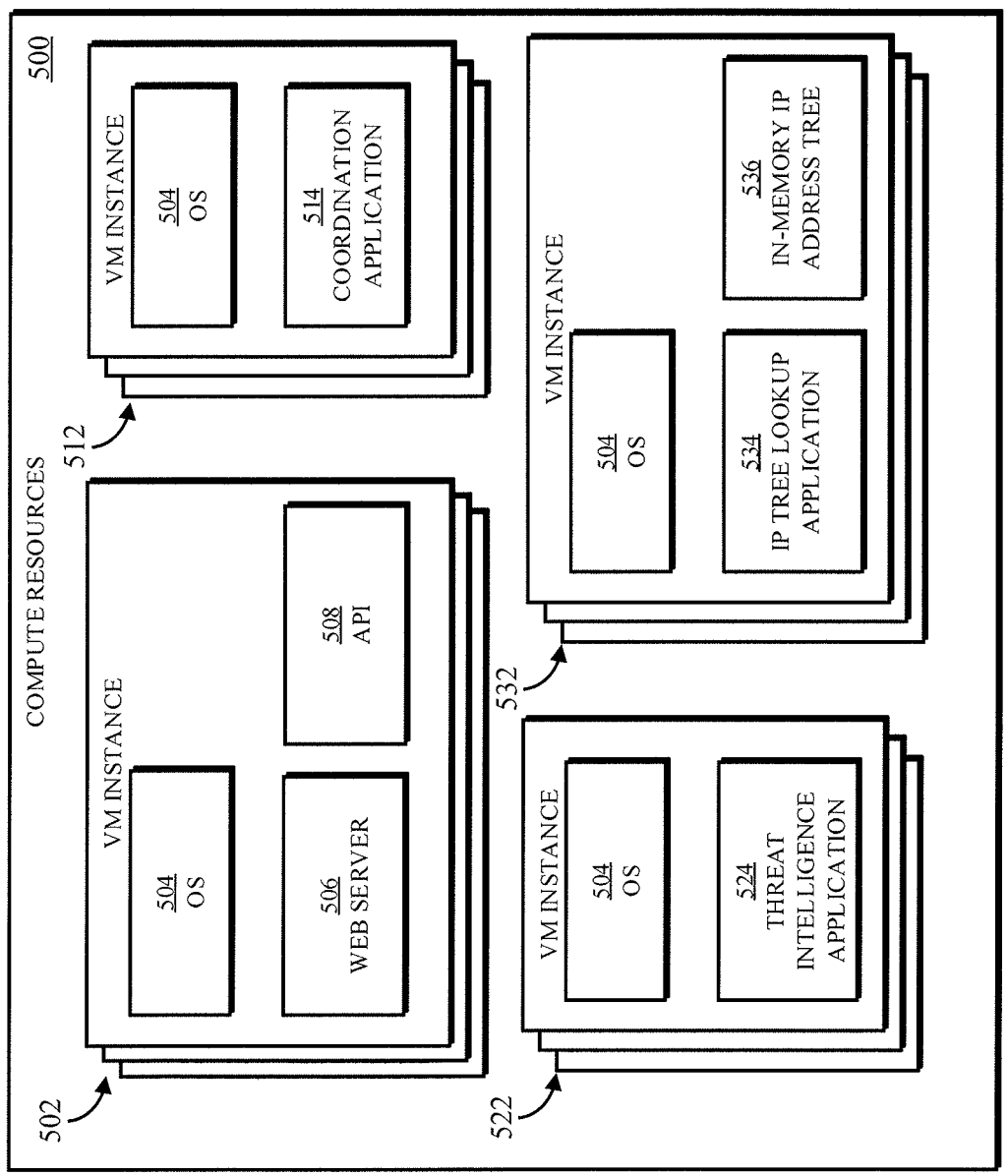
FIG. 5 is a diagram of an example of compute resources that can be used to implement one or more portions of system shown in FIGS. 1A and 1B in accordance with some embodiments of the disclosed subject matter.

FIG. 5 shows an example of a portion of compute resources 500 that can be used to implement one or more portions of system 100 shown in FIGS. 1A and 1B (e.g., threat intelligence coordination system 116, threat intelligence service 128, etc.) in accordance with some embodiments of the disclosed subject matter. In some embodiments, virtual machine instances deployed in compute resources 500 can be provided through a compute service that provides access to virtual machines that can launch and execute a variety of applications from software images. For example, in some embodiments, compute resources 500 can include any suitable number of virtual machines, such as virtual machine instances 502, 512, 522, and 532. In some embodiments, a "virtual machine instance" can refer to a specific allocation of virtual computing resources that has the properties of a particular virtual machine (VM) and is configured to launch and run software. For example, a virtual machine instance can be launched from a virtual machine image, which can, for example, represent the entire state of a virtual machine instance at the time it was imaged, such that a virtual machine instance and any software applications installed on the virtual machine instance can be restored to that point by restoring/launching the virtual machine image. As another example, software can be launched by a virtual machine using one or more software images, which can, for example, represent the entire state of a software application at the time it was imaged, such that the software application can be restored to this point by restoring/launching the software image. In some embodiments, virtual machine instance 502 can execute software to provide functionality of a web server based on a virtual machine image and/or one or more software images provided by a user of the virtual machine instance (e.g., a service provider associated with threat intelligence service 128).

As shown in FIG. 5, in some embodiments, VM instances 502 can have an OS 504, software 506 for providing web server functionality, and software 508 for providing one or more APIs that can be exposed to users of the threat intelligence service (e.g., as part of frontend 118). For example, VM instances 502 can receive requests from users (e.g., from computing device 102) of threat intelligence service 128 with log information (e.g., log information 130) to be evaluated for potentially malicious activity as an API call that is evaluated using API 508. In such an example, API 508 can evaluate the API call, and based on the contents of the API call, can cause the log information to be delivered to a threat intelligence service.

In some embodiments, VM instance 512 can have OS 504, and software 514 for providing a threat intelligence coordination application that can be used to implement at least a portion of threat intelligence coordination system 116. For example, threat intelligence coordination application 514 can receive subscription information (e.g., via an API provided by VM instances 502), and can associate the user that subscribed with the threat intelligence feed to which the user has subscribed (e.g., using a database, which can be provided by one or more VM instances, by one or more physical servers, as a database service, etc.).

In some embodiments, VM instance 522 can have OS 504, and software 524 for providing a threat intelligence application that can be used to implement at least a portion of threat intelligence service 128. For example, threat intelligence application 524 can receive log information associated with a particular user (e.g., via an API provided by VM instances 502), can parse the log information (e.g., to identify IP addresses included in the log information), and can submit the parsed log information to be evaluated using an in-memory IP address tree.

In some embodiments, VM instance 532 can have OS 504, software 534 for providing an application that checks an IP address tree for the presence of a particular IP address, and software 536 for maintaining an in-memory IP address tree in memory allocated to VM instance 532. For example, VM instance 532 can receive parsed log information that includes one or more IP addresses from a VM instance 522 executing threat intelligence application 524. In such an example, VM instance 532 can use software 534 to determine whether each IP address is in the in-memory IP address tree. VM instance 532, using software 534, can return information about whether each IP address is included in the in-memory IP address tree. More particularly, when an end user-generated communication, such as a request to use a customer's compute resources, is received by the system, VM instance 532 can use software 534 to identify the customer from the request, and also to identify an IP address of interest, such as the source IP address or the IP address of resources identified in the request. Software 534 can enable the VM instance 532 to convert the IP address into bit-format, and VM instance 532 can begin to scan a corresponding path in the in-memory IP address tree. If in tracing the path through the tree that is prescribed by the IP address VM instance 532 reaches a node of the tree that contains information, the IP address is malicious; otherwise, the IP address is not currently marked as potentially malicious.

If the IP address is malicious, next VM instance 532 can determine if the customer is associated with the node. For example, VM instance 532 can determine whether the customer is subscribed to the feed that the IP address was found in, as identified by the information in the node of the tree. If so, then VM instance 532 can send a response to the service indicating a threat was identified. Additionally or alternatively, VM instance 532 can use software 536 to update the endpoint identifiers (i.e., the nodes of the in-memory IP address tree), such as by merging customer-supplied malicious resource lists with the tree as described above. Note that, in some embodiments, each VM instance can be associated with one or more APIs for communicating with other VM instances in compute resources 500, and/or can communicate via another VM instance providing API functionality (e.g., VM instance 502).

In some embodiments, computing device 102 (and/or any other suitable compute resources associated with the user of computing device 102) can be provided using one or more VM instances executed by compute resources 500. For example, the user can launch one or more VM instances for providing a web server to host a web page, one or more instances for providing access to an application server that provides an application via the web page, etc. Additionally or alternatively, in some embodiments, compute resources associated with the user can be provided by one or more physical computing devices owned by the user (e.g., in a data center operated by, or on behalf of the user), by a different compute service, etc. In some embodiments, compute resources 500 can represent any suitable number of physical computing devices (e.g., servers) located in any suitable number of locations (e.g., one or more data centers, which may or may not be interconnected with low latency links). In some embodiments, information can be distributed amongst multiple VM instances providing the same or similar functionality (e.g., VM instances 502) using a load balancer (and/or any other suitable technique or combination of techniques).

Note that although FIG. 5 is described in connection with a compute service, a network-accessible services system can be provided using a similar configuration of hardware and software devices. For example, a network-accessible services system can be used to run various program codes on-demand using virtual computing resources provided by compute resources 500. In a more particular example, a service provider can configure the network-accessible services system to receive requests to execute program codes from a user (e.g., user A, threat intelligence coordination system 116, frontend 118, threat intelligence service 128, etc.) without requiring that the user configure a particular virtual machine instance, one or more containers executed by the virtual machine instance, etc. In some embodiments, the network-accessible services system can receive the code to be executed (and/or identifying information of code to be executed), information to be used in executing the code, etc., can assign a VM instance to execute the code, and in some cases, provide output that is generated during execution of the code. In some embodiments, VM instances of a network-accessible services system may not be associated with a particular user, but may instead be used by many different users (simultaneously and/or serially) to execute program codes. In some embodiments, a network-accessible services system can be used to provide any suitable functionality described herein (e.g., parsing threat information, parsing log information, etc.).

Figure 6:
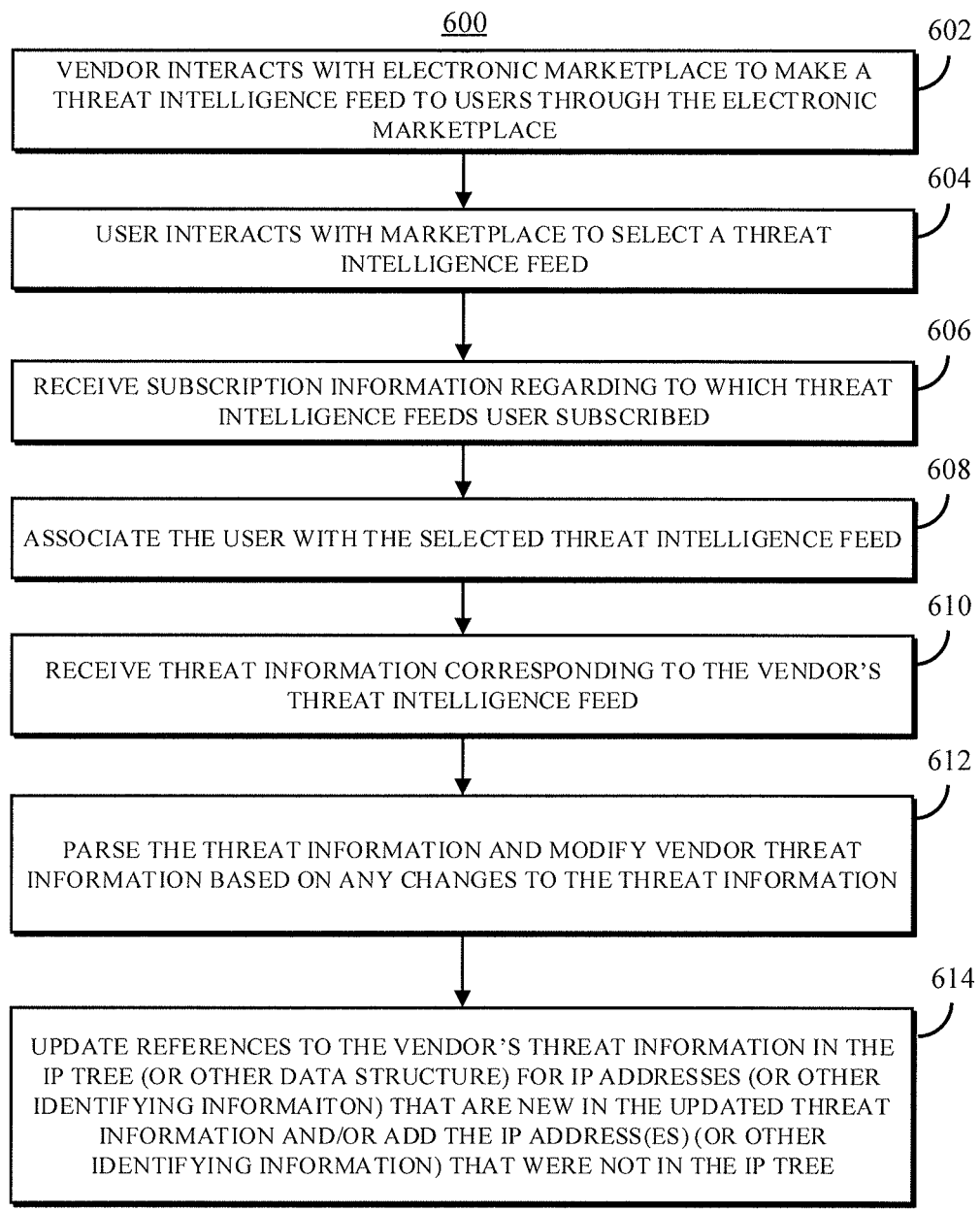
FIG. 6 is a flowchart of an example process for subscribing a user to threat information from a threat information provider in a subscription-based multi-tenant threat intelligence service in accordance with some embodiments of the disclosed subject matter.

FIG. 6 shows an example 600 of a process for subscribing a user to threat information from a threat information provider in a subscription-based multi-tenant threat intelligence service in accordance with some embodiments of the disclosed subject matter. As shown in FIG. 6, at 602, a vendor can interact with a user interface of an electronic marketplace (e.g., marketplace 104) to make a threat intelligence feed available to users through the electronic marketplace. In some embodiments, the user interface associated with the electronic marketplace can collect any suitable information from the vendor, such as descriptive information about the threat intelligence feed (e.g., whether it is more relevant to particular types of users, such as users in certain industries, descriptive information about the vendor, descriptive information about the threat intelligence, etc.). Additionally, in some embodiments, the user interface associated with the electronic marketplace can collect information about how update information for the threat intelligence feed can be retrieved (e.g., information regarding whether the threat intelligence feed has been updated), such as a URL. In some embodiments, the vendor can interact with the user interface associated with the electronic marketplace to identify how the threat information can be retrieved (e.g., a location where the threat intelligence information is to be stored, login credentials for the vendor's web site, etc.).

In some embodiments, the vendor can interact with the electronic marketplace and/or with a developer associated with the electronic marketplace to identify how the threat intelligence feed is formatted and/or changes that the vendor is to implement to the formatting of the threat intelligence feed. Additionally, in some embodiments, the electronic marketplace, one or more systems associated with the electronic marketplace, and/or a developer associated with the electronic marketplace, can evaluate the vendor and/or the threat intelligence information to determine whether the threat intelligence information provided by the vendor meets standards for reliability and/or utility.

At 604, a user can interact with the electronic marketplace to select one or more threat intelligence feeds to which the user wishes to subscribe. In some embodiments, the electronic marketplace (e.g., electronic marketplace 104) can provide a user interface for discovering, reviewing, and/or selecting one or more threat intelligence feeds. Additionally, in some embodiments, the electronic marketplace can provide a user interface for the user to specify which compute resources with which the subscription is to be associated (e.g., by prompting the user to log in to an account associated with the compute service), and input (and/or specify) payment information.

At 606, process 600 can receive subscription information from the electronic marketplace. In some embodiments, the subscription information can be received by the threat intelligence coordination system (e.g., threat intelligence coordination system 116) and/or the threat intelligence service (e.g., threat intelligence service 126), and can indicate to which threat intelligence feed(s) a particular user has subscribed. In some embodiments, the subscription information can be received from any suitable computing device. For example, as described above in connection with FIGS. 1A and 1B, the subscription information can be sent by the electronic marketplace to a message relay service, which can make the subscription information available to the threat intelligence coordination system and/or the threat intelligence service.

At 608, process 600 can associate the user that subscribed to a threat intelligence feed with that threat intelligence feed. For example, process 600 can create and/or modify a database entry associated with the user to indicate which threat intelligence feed(s) the user is associated with (i.e., has subscribed to). As another example, process 600 can create and/or modify a database entry associated with the threat intelligence feed to indicate that the user is a subscriber of the threat intelligence feed.

At 610, process 600 can receive threat information corresponding to the vendor's threat intelligence feed. In some embodiments, process 600 can receive the threat intelligence information using any suitable technique or combination of techniques, and can receive the threat intelligence information at any suitable time. For example, in some embodiments, process 600 can periodically (e.g., at regular intervals) check whether the threat information has been updated. In a more particular example, process 600 can request information from a URL specified by the vendor of the threat intelligence feed that indicates whether the threat intelligence feed has been updated (e.g., by indicating a time when the threat intelligence feed was last updated). In such an example, process 600 can retrieve the updated threat information when the threat intelligence feed has been updated (e.g., by retrieving the threat information from the electronic data store associated with the vendor, by downloading the threat information from a URL associated with the updated threat information, etc.). As another example, process 600 can periodically (e.g., at regular intervals) download the threat information corresponding to the threat intelligence feed and determine whether the information has changed based on a comparison of the previous threat information and the current threat information. As yet another example, in some embodiments, process 600 can receive a notification from the vendor when the threat information has been updated. As still another example, the vendor can upload updated threat information to a computing device executing at least a portion of process 600.

At 612, process 600 can parse the threat information received at 610, and modify any suitable vendor threat information based on any changes to the threat information. For example, in some embodiments, process 600 can identify any suitable type of information from the received threat information (e.g., IP addresses, domains, URLs, file signatures, etc.), and can format the identified information in a common format that all threat information is converted to. As another example, as described above in connection with FIG. 1, in some embodiments, process 600 can use a network-accessible services system to parse the new and/or updated threat information. As yet another example, process 600 can search the threat information for individual threat information by searching for particular symbols or combinations of symbols, particular strings of text, etc.

In some embodiments, process 600 can compare newly received threat information to previously received threat information from the same threat intelligence feed to determine whether there are any changes and/or what changes have been made between the previous version of the threat information and the current version of the threat information. Process 600 can use any suitable technique or combination of techniques to find differences between versions of threat information received as part of a threat intelligence feed.

At 614, process 600 can make any suitable updates and/or modifications to the in-memory IP address tree (and/or any other suitable data structure) to reflect changes to the threat information. For example, process 600 can update and/or modify references to the threat intelligence feed in the in-memory IP address tree for IP addresses that are newly added in the new and/or updated threat information. In a more particular example, process 600 can associate an IP address(es) from the new and/or updated threat information with information identifying the threat intelligence feed associated with the new and/or updated threat information. Additionally, as described above in connection with FIGS. 1A and 1B, process 600 can associate the IP address(es) from the new and/or updated threat information with information that can be communicated to a user to indicate the nature of the threat associated with the IP address (e.g., based on the description in the threat information).

Additionally, in some embodiments, process 600 can remove and/or modify references in the in-memory IP address tree (and/or any other suitable data structure) for an IP address(es) (and/or any suitable identifying information) that are no longer present in the updated threat information and/or remove the IP address(es) from the in-memory IP address tree if the reference to that IP address is the only remaining reference. In some embodiments, process 600 can remove a reference from an IP address in the in-memory IP address if the IP address is not included in the new and/or updated threat information. Additionally, in some embodiments, process 600 can remove references to the threat intelligence feed in the in-memory IP address tree for an IP address not included in the new and/or updated threat information (and, in some cases the IP address) when the IP address has not appeared in new and/or updated threat information provided by the vendor for at least a threshold amount of time (e.g., one day, one week, etc.) and/or times (e.g., not in the last update, not in the last three updates, etc.). In some embodiments, process 600 can update the in-memory IP address tree (and/or any other suitable data structure) at any suitable regular or irregular intervals. For example, in some embodiments, process 600 can update the in-memory IP address tree (and/or any other suitable data structure) once every thirty second, one minute, two minutes, five minutes, etc. As another example, process 600 can update the in-memory IP address tree (and/or any other suitable data structure) when certain events occur (e.g., new threat information has been received from a particular vendor).

Figure 7:
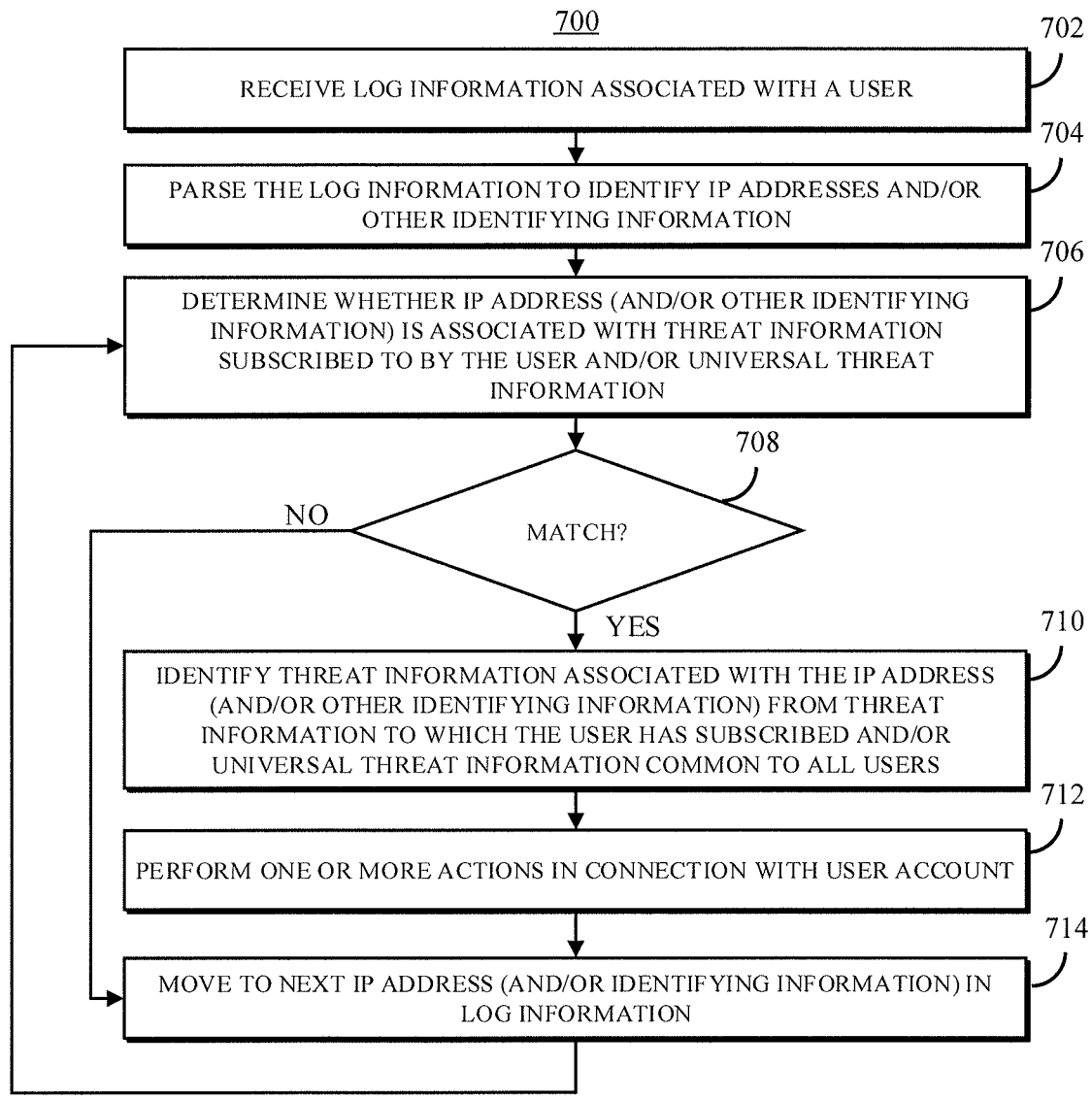
FIG. 7 is a flowchart of an example process for monitoring activity associated with a particular user account in accordance with some embodiments of the disclosed subject matter.

FIG. 7 shows an example 700 of a process for monitoring activity associated with a particular user account in accordance with some embodiments of the disclosed subject matter. As shown in FIG. 7, at 702, process 700 can receive log information (e.g., log information 122, new log information 306, etc.) associated with a user account (e.g., a user associated with computing device 102). As described above in connection with FIGS. 1A and 1B, the log information can include network activity to and/or from computing devices associated with the user (e.g., to/from a virtual network associated with the user, to/from one or more servers associated with the user, etc.), any calls made to APIs from the user's account (e.g., APIs for services available from the same service provider providing the threat intelligence service, APIs for services available from a service associated with the service provider providing the threat intelligence service, etc.), and/or any other suitable activity (e.g., state changes, file uploads and/or downloads, etc.).

At 704, process 700 can parse the log information (if necessary) to identify IP addresses (and/or any other suitable identifying information) included in the log information. In some embodiments, process 700 can use any suitable technique or combination of techniques to parse the log information. For example, as described above in connection with FIGS. 1A and 1B, process 700 can use a network-accessible services system to parse the log information.

At 706, process 700 can determine, for a first IP address in the log information, whether the IP address is associated with threat information received from a threat intelligence feed to which the user has subscribed and/or universal threat information (e.g., provided by a service provider providing access to process 700). Process 700 can use any suitable technique or combination of techniques to determine whether each IP address matches an IP address from a threat intelligence feed to which the user has subscribed. For example, as described above in connection with FIGS. 1A and 1B, process 700 can look up each IP address using an in-memory IP address tree to determine whether the IP address is represented in the tree, and if it is, whether it is associated with universal threat information (i.e., common to all users) and/or with threat information submitted by the user (e.g., in log information 122). Additionally, in some embodiments, the IP address can be associated with an indication that the user has requested that the IP address not be flagged as being potentially malicious regardless of whether there is universal or user-specific threat information associated with the IP address (e.g., the IP address has been white listed by the user). In some embodiments, one or more portions of process 700 can be carried out in parallel by many different computing devices simultaneously. For example, as described above in connection with FIGS. 1 and 5, process 700 can route one or more portions of received log information to a computing device (e.g., a VM instance) maintaining a replica of an in-memory IP address tree based on the workload of various VM instances maintaining replicas of the in-memory IP address tree.

If the IP address from the log information does not match an IP address in the in-memory IP address tree that is associated with universal and/or user-specific threat information (or matches, but the IP address has been white listed by the user) ("NO" at 708), process 700 can move to 714 and move to a next IP address from the log information (if one exists). Note that an IP address from the log information may match an IP address in the in-memory IP address tree even if the IP address is not associated with universal threat information or threat information specific to the user that submitted the log information. For example, the in-memory IP address tree can include the IP address from the log information in association with threat information that from a threat intelligence feed to which another user (but not the user associated with the log information) has subscribed. In some embodiments, process 700 can inhibit any action(s) (e.g., as described below in connection with 712) from being taken in connection the threat information associated with that IP address using any suitable technique or combination of techniques. For example, process 700 can inhibit an action from being taken by moving to 714 without performing any further actions. As another example, process 700 can inhibit the user from being notified, but can take another action, such as recording information indicating that the IP addresses was identified as being potentially malicious in association with an indication of which threat intelligence feed included threat information association with that IP address. In such an example, if the user later subscribes to that other threat intelligence feed, process 700 can indicate that previous activity was detected as being potentially malicious as part of a process of associating the user with the other threat intelligence feed (e.g., as part of process 600). Otherwise, if the IP address from the log information matches an IP address in the in-memory IP address tree that is associated with universal and/or threat information from a threat intelligence feed to which the user has subscribed ("YES" at 708), process 700 can move to 710.

At 710, process 700 can identify specific threat information associated with the IP address that was submitted from a threat intelligence feed to which the user has subscribed and/or that is universal threat information that is common to all users of the threat intelligence system (and/or all users of the threat intelligence system in a particular group). Process 700 can use any suitable technique or combination of techniques to identify threat information. For example, descriptive information about the threat potentially posed by the IP address (and/or any other suitable information) can be stored in connection with the IP address in the in-memory IP address tree. As another example, descriptive information about the threat potentially posed by the IP address (and/or any other suitable information) can be stored in a database (e.g., threat intelligence database 118), and the IP address (or any other suitable identifying information, which may be stored in connection with the in-memory IP address tree) can be used to access the threat information received from the threat intelligence feed and/or universal threat information.

At 712, process 700 can perform one or more actions in connection with the user account based on the threat information. For example, in some embodiments, process 700 can cause a message (e.g., an email, a push notification, a text message, a secure message accessible through a user interface for the threat intelligence service accessible through the frontend, a website interface, etc.) to be transmitted to the user associated with the user account that provided the log information with identifying information of the IP address, a description of the threat potentially posed by the IP address, information identifying what sort of activity was associated with the IP address, etc. As another example, in some embodiments, process 700 can store a message in an electronic data store associated with the user (e.g., electronic data store 106). As still another example, process 700 can make the threat information available as part of a document (e.g., a webpage, an xml document, etc.) that a computing device associated with the user (e.g., computing device 102) can access for threat information.

Additionally or alternatively, in some embodiments, at 712, process 700 can take one or more actions on behalf of the user based on the threat information identified at 710 (e.g., as described above in connection with FIG. 1). For example, in a case where a user account associated with the user has sent a request to an API from a potentially malicious IP address, process 700 can, at least temporarily, cause access by that user account to be suspended. As another example, in a case where information was received by one or more computing devices associated with the user from a potentially malicious IP address, process 700 can, at least temporarily, inhibit further traffic from that IP address to the computing devices associated with the user. As still another example, in a case where information was sent by one or more computing devices associated with the user to a potentially malicious IP address, process 700 can, at least temporarily, inhibit further traffic from that being sent to that IP address from computing devices associated with the user.

At 714, process 700 can move to a next IP address from the log information to determine whether it is associated with universal and/or threat information received from a threat intelligence feed. Additionally or alternatively, process 700 can determine whether any suitable number of IP addresses are associated with universal and/or threat information received from a threat intelligence feed in parallel.

Figure 8:
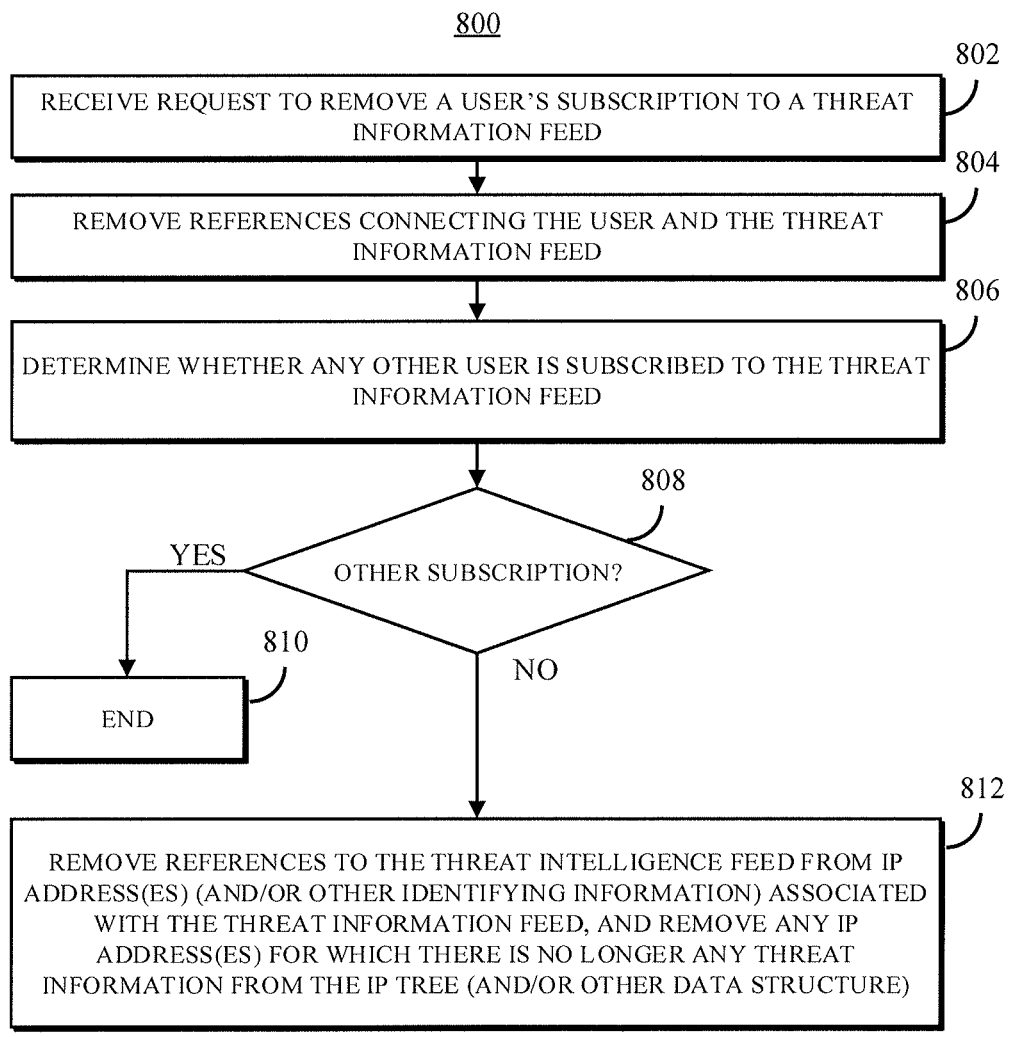
FIG. 8 is a flowchart of an example process for unsubscribing a particular user from threat information from a particular threat information provider in accordance with some embodiments of the disclosed subject matter.

FIG. 8 shows an example 800 of a process for unsubscribing a particular user from threat information from a particular threat information provider in accordance with some embodiments of the disclosed subject matter. As shown in FIG. 8, at 802, process 800 can receive a request to remove a user's subscription to a threat information feed. For example, in some embodiments, process 800 can receive a request from the electronic marketplace indicating that a user has cancelled a subscription to a particular threat intelligence feed. In some embodiments, a user can submit an explicit request to cancel the subscription. Additionally or alternatively, in some embodiments, a user can choose not to renew the subscription (e.g., either by taking a particular action or passively by not taking an action to renew the subscription). In some embodiments, in cases in which the subscription is associated with a particular period of time (e.g., a day, a week, a month, a year, etc.), if subscription is not being renewed (thereby cancelling the subscription), the electronic marketplace can maintain information indicating when each subscription expires, and can provide a message (e.g., to message relay service 112) to indicate that the user's subscription has been cancelled. Additionally or alternatively, the electronic marketplace can convey information to the threat intelligence computing environment indicating a duration for which the subscription is valid, and process 800 can determine whether the user's subscription has expired based on the duration information (e.g., by comparing a date and/or time received from the electronic marketplace to a current date and/or time). In some embodiments, a user may choose to cancel all subscriptions (or be forced to cancel all subscriptions, e.g., in a case where the user fails to pay for a service, engages in prohibited behavior, etc.). In some embodiments, a vendor can remove one or more threat intelligence feeds (and/or the service provider of the electronic marketplace and/or the threat intelligence service can cause one or more threat intelligence feeds from a vendor to be removed (e.g., based on poor reviews, poor performance, engaging in prohibited behavior, etc.). In some such embodiments, the removal of a feed can be treated similarly to a user cancelling a subscription, except that it is equivalent to all user's that were subscribing to the feed cancelling the subscription.

At 804, process 800 can remove references connecting the user and the threat intelligence feed. For example, process 800 can remove references to the threat intelligence feed from a database (or other data structure) entry associated with the user. As another example, process 800 can remove references to the user from a database (or other data structure) entry associated with the threat intelligence feed.

At 806, process 800 can determine whether any other user is subscribed to the threat information feed that a user requested be cancelled at 802. For example, process 800 can determine whether there is any other user identifying information associated with a database (or other data structure) entry associated with the threat intelligence feed. As another example, process 800 can determine whether the threat intelligence feed is associated with any other users (e.g., by querying a database of user information for entries that include a reference to the threat intelligence feed).

If there is another user associated with the threat intelligence feed ("YES" at 808), process 800 can move to 810, where process 800 can end.

Otherwise, if there are no other users subscribed to the same threat intelligence feed ("NO" at 808), process 800 can move to 812. At 812, process 800 can remove references to the threat intelligence feed from any IP address(es) included in the threat information most recently received from the threat intelligence feed (and any other IP addresses that still have such references associated with them). Additionally, in some embodiments, process 800 can determine whether any other threat information is associated with each of the IP addresses from which references to the threat information is being removed, and remove any IP addresses for which the reference to the threat intelligence feed was the only threat information associated with the IP address.

Note that, in some embodiments, process 800 can omit one or more of 806-812 when a user cancels a subscription. In such embodiments, IP addresses (and/or other identifying information) and/or threat information associated with an IP address (and/or other identifying information) can be maintained in the in-memory IP address tree (and/or any other suitable data structure) regardless of whether it is associated with any users and/or threat information. For example, process 800 can wait to remove IP addresses (and/or other identifying information) and/or threat information associated with an IP address (and/or other identifying information) in anticipation of another user potentially becoming associated with the threat information feed. In some embodiments, process 800 can wait for any suitable amount of time before removing such information from the in-memory IP address tree (and/or any other suitable data structure), or can maintain the information indefinitely.

In accordance with some embodiments of the disclosed subject matter, a system is provided, the system comprising: a first electronic data store configured to store threat information describing suspected sources of malicious computing activity; and one or more hardware computing devices in communication with the first electronic data store and configured to execute specific computer-executable instructions that upon execution cause the system to: receive first threat information corresponding to a first threat intelligence feed from a first source, wherein the first threat information comprises first identifying information of a first suspected malicious remote endpoint; receive an indication that a first user associated with a first computing resource has subscribed to the first threat intelligence feed; receive first log information describing activity of a first computing resource associated with a first user, wherein the first log information indicates that first identifying information of a first remote endpoint is included in the activity of the first computing resource; determine that the first identifying information of the first remote endpoint is included in the threat information using an in-memory data structure that includes an entry corresponding to the first suspected malicious remote endpoint; and perform a first action associated with addressing a detection of malicious computing activity.

In some embodiments, execution of the specific computer-executable instructions further causes the system to:

receive an indication that a second user associated with a second computing resource has subscribed to a second threat intelligence feed stored in the first electronic data store; receive second log information corresponding to activity of a second computing resource associated with the second user, wherein the second log information indicates that the first identifying information of the first remote endpoint is included in the activity of the second computing resource; determine that the first identifying information of the first remote endpoint does not correspond to the second threat information subscribed to by the second user; and inhibit the first identifying information of the first remote endpoint from being sent to the second user as representing potentially malicious activity by the second computing resource.

In some embodiments, the in-memory data structure is an in-memory IP address tree, the first identifying information of the first remote endpoint includes a first IP address, and the first identifying information of the first suspected malicious remote endpoint includes a first suspected malicious IP address, and wherein execution of the computer-specific instructions further causes the system to modify the in-memory IP address tree to include a node corresponding to the first suspected malicious IP address, the node including information indicating that the first suspected malicious IP address is associated with the first threat information corresponding to the first threat intelligence feed.

In some embodiments, the one or more hardware computing devices comprise memory, and wherein execution of the specific computer-executable instructions further causes the system to: create in the memory an IP address tree comprising a plurality of nodes each associated with a corresponding suspected malicious IP address of a plurality of suspected malicious IP addresses included in the threat information stored in the first electronic data store, wherein the IP address tree is read-only; create, as the in-memory data structure, a copy of the IP address tree in the memory, wherein the first identifying information of the first remote corresponds to a node in the in-memory IP address tree; update the copy of the in-memory IP address tree to include a first suspected malicious IP address, wherein the first identifying information of the first suspected malicious remote endpoint is the first suspected malicious IP address; use the read-only IP address tree when determining whether a particular IP address is represented in the IP address tree; and replace the IP address tree with the copy of the IP address tree after a predetermined period of time.

In some embodiments, a system is provided, the system comprising one or more hardware computing devices configured to execute specific computer-executable instructions that upon execution cause the one or more hardware computing devices to: receive first threat information associated with a first source of a first threat intelligence feed; receive an indication that a first user associated with a first computing resource within a compute environment has subscribed to the first threat intelligence feed; determine, based on the first threat information and the first user's subscription to the first threat intelligence feed, that a portion of activity associated with the first computing resource includes activity by an endpoint identified in the first threat information; and in response to determining that the portion of the activity includes activity by an endpoint identified in the first threat information, perform an action.

In some embodiments, the first threat information comprises a first plurality of IP addresses and execution of the specific computer-executable instructions further causes the one or more hardware computing devices to: generate an in-memory IP address tree using the first plurality of IP addresses; receive first log information corresponding to the activity associated with the first computing resource; and determine that the activity associated with the first computing resource includes potentially malicious activity based at least in part on the presence of an IP address in the first log information matching an IP address in the in-memory IP address tree.

In some embodiments, execution of the specific computer-executable instructions further causes the one or more hardware computing devices to: determine that a second IP address included in the first log information corresponds to an IP address in the in-memory IP address tree associated with universal threat information; and cause the second IP address to be sent to the first user as representing potentially malicious network activity.

In some embodiments, the first log information comprises identifying information of one or more remote endpoints that one or more computing devices associated with the first user, including the first computing resource, received communications from, and identifying information of one or more remote endpoints that the one or more computing devices associated with the first user sent communications to.

In some embodiments, the one or more computing devices are virtual machine instances provided by a compute service used by the first user.

In some embodiments, the first log information comprises identifying information of one or more remote endpoints from which an API call was made using credentials associated with the first user.

In some embodiments, execution of the specific computer-executable instructions further causes the one or more hardware computing devices to receive the first threat information from the first source via an API.

In some embodiments, execution of the specific computer-executable instructions further causes the one or more hardware computing devices to receive the indication that the first user associated with the first computing resource has subscribed to the first threat intelligence feed from an electronic marketplace on which the first user subscribed to the first threat intelligence feed.

In some embodiments, execution of the specific computer-executable instructions further causes the one or more hardware computing devices to: receive, from the electronic marketplace, an indication that the first user associated with the first computing resource has unsubscribed to the first threat intelligence feed; and remove an association between the first user and the first threat intelligence feed based on the indication that the first user has unsubscribed to the first threat intelligence feed.

In some embodiments, a method is provided, the method comprising: receiving first threat information associated with a first source of a first threat intelligence feed; receiving an indication that a first user associated with a first computing resource within a compute environment has subscribed to the first threat intelligence feed; determining, based on the first threat information and the first user's subscription to the first threat intelligence feed, that a portion of activity associated with the first computing resource includes activity by an endpoint identified in the first threat information; and in response to determining that the portion of the activity includes activity by an endpoint identified in the first threat information, performing an action.

In some embodiments, the first threat information comprises a first plurality of IP addresses, the method further comprising: generating an in-memory IP address tree using the first plurality of IP addresses; receiving first log information corresponding to the activity associated with the first computing resource; and determine that the activity associated with the first computing resource includes potentially malicious activity based on the presence of an IP address in the first log information matching an IP address in the in-memory IP address tree.

In some embodiments, the method further comprises: determining that a second IP address included in the first log information corresponds to an IP address in the in-memory IP address tree associated with universal threat information; and causing the second IP address to be sent to the first user as representing potentially malicious network activity.

In some embodiments, the first log information comprises identifying information of one or more remote endpoints that one or more computing devices associated with the first user, including the first computing resource, received communications from, and identifying information of one or more remote endpoints that the one or more computing devices associated with the first user sent communications to.

In some embodiments, the one or more computing devices are virtual machine instances provided by a compute service used by the first user.

In some embodiments, the first log information comprises identifying information of one or more remote endpoints from which an API call was made using credentials associated with the first user.

In some embodiments, the method further comprises receiving the first threat information from the first source via an API.

In some embodiments, any suitable computing device or combination of computing devices can execute one or more portions of processes 600, 700, and 800. For example, one or more computing devices associated with threat intelligence coordination system 116 and/or threat intelligence service 126 can execute one or more portions of processes 600, 700, and/or 800.

Although subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

It should be understood that the above described steps of the processes of FIGS. 6-8 can be executed or performed in any order or sequence not limited to the order and sequence shown and described in the figures. Also, some of the above steps of the processes of FIGS. 6-8 can be executed or performed substantially simultaneously where appropriate or in parallel to reduce latency and processing times.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising:
a first electronic data store configured to store threat information describing suspected sources of malicious computing activity; and
one or more hardware computing devices in communication with the first electronic data store and configured to execute specific computer-executable instructions that upon execution cause the system to:
receive first threat information corresponding to a first threat intelligence feed from a first source, wherein the first threat information comprises first identifying information of a first suspected malicious remote endpoint;
receive second threat information corresponding to a second threat intelligence feed from a second source, wherein the second threat information comprises second identifying information of a second suspected malicious remote endpoint, and does not include the first identifying information of the first suspected malicious remote endpoint;
receive an indication that a first user associated with a first computing resource has subscribed to the first threat intelligence feed, wherein the first user is associated with a first entity;
receive first log information describing activity of a first plurality of computing resources, including the first computing resource, that are each associated with the first entity, wherein the first log information indicates that first identifying information of a first remote endpoint is included in the activity of the first computing resource;
determine that the first identifying information of the first remote endpoint is included in the threat information using an in-memory data structure that includes an entry corresponding to the first suspected malicious remote endpoint;
perform a first action associated with addressing a detection of malicious computing activity;
receive an indication that a second user associated with a second computing resource has subscribed to the second threat intelligence feed stored in the first electronic data store, wherein the second user is associated with a second entity that is different than the first entity;

receive second log information corresponding to activity of a second plurality of computing resources, including the second computing resource, that are each associated with the second user, wherein the second log information indicates that the first identifying information of the first remote endpoint is included in the activity of the second computing resource;

determine that the first identifying information of the first remote endpoint does not correspond to the second threat information subscribed to by the second user using the in-memory data structure that includes an entry corresponding to the first suspected malicious remote endpoint;

determine that the second user has not subscribed to the first threat intelligence feed; and in response to determining that the identifying information of the first remote endpoint does not correspond to the second threat information and that the second user has not subscribed to the first threat intelligence feed, inhibit the first identifying information of the first remote endpoint from being sent to the second user as representing potentially malicious activity by the second computing resource.

2. The system of claim 1, wherein the in-memory data structure is an in-memory Internet Protocol ("IP") address tree, the first identifying information of the first remote endpoint includes a first IP address, and the first identifying information of the first suspected malicious remote endpoint includes a first suspected malicious IP address, and wherein execution of the specific computer-executable instructions further causes the system to modify the in-memory IP address tree to include a node corresponding to the first suspected malicious IP address, the node including information indicating that the first suspected malicious IP address is associated with the first threat information corresponding to the first threat intelligence feed.

3. The system of claim 1, wherein the one or more hardware computing devices comprise memory, and wherein execution of the specific computer-executable instructions further causes the system to:

create in the memory an IP address tree comprising a plurality of nodes each associated with a corresponding suspected malicious IP address of a plurality of suspected malicious IP addresses included in the threat information stored in the first electronic data store, wherein the IP address tree is read-only;

create, as the in-memory data structure, a copy of the IP address tree in the memory, wherein the first identifying information of the first remote endpoint corresponds to a node in the in-memory IP address tree;

update the copy of the in-memory IP address tree to include a first suspected malicious IP address, wherein the first identifying information of the first suspected malicious remote endpoint is the first suspected malicious IP address;

use the read-only IP address tree when determining whether a particular IP address is represented in the IP address tree; and replace the IP address tree with the copy of the IP address tree after a predetermined period of time.

4. A system, comprising one or more hardware computing devices configured to execute specific computer-executable instructions that upon execution cause the one or more hardware computing devices to:

receive first threat information associated with a first source of a first threat intelligence feed, wherein the first threat information comprises a first plurality of IP addresses;

receive second threat information associated with a second source of a second threat intelligence feed;

receive an indication that a first user associated with a first computing resource within a first compute environment has subscribed to the first threat intelligence feed;

receive an indication that a second user associated with a second computing resource within a second compute environment has subscribed to the second threat intelligence feed;

obtain an in-memory IP address tree using the first plurality of IP addresses;

receive first log information corresponding to the activity associated with the first computing resource;

determine, based on the presence of an IP address in the first log information matching an IP address in the in-memory IP address tree and the existence of the first user's subscription to the first threat intelligence feed, that a portion of activity associated with the first computing resource includes potentially malicious activity by a first endpoint identified in the first threat information;

in response to determining that the portion of the activity associated with the first computing resource includes potentially malicious activity by the first endpoint identified in the first threat information, perform a first action;

determine that a second IP address included in the first log information corresponds to an IP address in the in-memory IP address tree associated with universal threat information;

cause the second IP address to be sent to the first user as representing potentially malicious network activity;

determine, based on the second threat information and the existence of the second user's subscription to the second threat intelligence feed, that a portion of activity associated with the second computing resource includes activity by a second endpoint identified in the second threat information; and in response to determining that the portion of the activity associated with the second computing resource includes activity by the second endpoint identified in the second threat information, perform a second action.

5. The system of claim 4, wherein the first log information comprises identifying information of one or more remote endpoints that one or more computing devices associated with the first user, including the first computing resource, received communications from, and identifying information of one or more remote endpoints that the one or more computing devices associated with the first user sent communications to.

6. The system of claim 5, wherein the one or more computing devices are virtual machine instances provided by a compute service used by the first user.

7. The system of claim 4, wherein the first log information comprises identifying information of one or more remote endpoints from which an application program interface ("API") call was made using credentials associated with the first user.

8. The system of claim 4, wherein execution of the specific computer-executable instructions further causes the one or more hardware computing devices to receive the first threat information from the first source via an API.

9. The system of claim 4, wherein execution of the specific computer-executable instructions further causes the one or more hardware computing devices to receive the indication that the first user associated with the first computing resource has subscribed to the first threat intelligence feed from an electronic marketplace on which the first user subscribed to the first threat intelligence feed.

10. The system of claim 9, wherein execution of the specific computer-executable instructions further causes the one or more hardware computing devices to:
 receive, from the electronic marketplace, an indication that the first user associated with the first computing resource has unsubscribed to the first threat intelligence feed; and
 remove an association between the first user and the first threat intelligence feed based on the indication that the first user has unsubscribed to the first threat intelligence feed.

11. A method, comprising:
 receiving first threat information associated with a first source of a first threat intelligence feed;
 receiving second threat information associated with a second source of a second threat intelligence feed;
 receiving an indication that a first user associated with a first computing resource within a first compute environment has subscribed to the first threat intelligence feed;
 receiving an indication that a second user associated with a second computing resource within a second compute environment has subscribed to the second threat intelligence feed;
 obtaining an in-memory IP address tree using a first plurality of IP addresses;
 receiving first log information corresponding to activity associated with the first computing resource;
 determining, based on the presence of an IP address in the first log information matching an IP address in the in-memory IP address tree and the existence of the first user's subscription to the first threat intelligence feed, that a portion of activity associated with the first computing resource includes potentially malicious activity by a first endpoint identified in the first threat information;
 in response to determining that the portion of the activity associated with the first computing resource includes potentially malicious activity by the first endpoint identified in the first threat information, performing a first action;
 determining that a second IP address included in the first log information corresponds to an IP address in the in-memory IP address tree associated with universal threat information;
 causing the second IP address to be sent to the first user as representing potentially malicious network activity;
 determining, based on the second threat information and the existence of the second user's subscription to the second threat intelligence feed, that a portion of activity associated with the second computing resource includes activity by a second endpoint identified in the second threat information; and
 in response to determining that the portion of the activity associated with the second computing resource includes activity by the second endpoint identified in the second threat information, performing a second action.

12. The method of claim 11, wherein the first log information comprises identifying information of one or more remote endpoints that one or more computing devices associated with the first user, including the first computing resource, received communications from, and identifying information of one or more remote endpoints that the one or more computing devices associated with the first user sent communications to.

13. The method of claim 12, wherein the one or more computing devices are virtual machine instances provided by a compute service used by the first user.

14. The method of claim 11, wherein the first log information comprises identifying information of one or more remote endpoints from which an application program interface ("API") call was made using credentials associated with the first user.

15. The method of claim 11, further comprising receiving the first threat information from the first source via an API.

* * * * *